(12) United States Patent
Teng et al.

(10) Patent No.: US 9,712,435 B2
(45) Date of Patent: Jul. 18, 2017

(54) CLOUD-BASED SERVICES EXCHANGE

(71) Applicant: Equinix, Inc., Redwood City, CA (US)

(72) Inventors: Juxiang Teng, Walnut Creek, CA (US); Ihab Tarazi, Burlingame, CA (US)

(73) Assignee: Equinix, Inc., Redwood City, CA (US)

( * ) Notice: Subject to any disclaimer, the term of this patent is extended or adjusted under 35 U.S.C. 154(b) by 0 days.

(21) Appl. No.: 15/344,100

(22) Filed: Nov. 4, 2016

(65) Prior Publication Data
US 2017/0093702 A1 Mar. 30, 2017

Related U.S. Application Data

(63) Continuation of application No. 15/099,407, filed on Apr. 14, 2016.

(60) Provisional application No. 62/149,374, filed on Apr. 17, 2015.

(51) Int. Cl.
| | |
|---|---|
| G06F 15/16 | (2006.01) |
| H04L 12/723 | (2013.01) |
| H04L 29/08 | (2006.01) |
| H04L 29/12 | (2006.01) |
| H04L 12/46 | (2006.01) |

(52) U.S. Cl.
CPC .......... *H04L 45/50* (2013.01); *H04L 12/4633* (2013.01); *H04L 12/4641* (2013.01); *H04L 61/256* (2013.01); *H04L 67/10* (2013.01)

(58) Field of Classification Search
CPC . H04L 45/50; H04L 12/4633; H04L 12/4641; H04L 61/256; H04L 67/10
USPC ........................................................ 709/217
See application file for complete search history.

(56) References Cited

U.S. PATENT DOCUMENTS

| | | | |
|---|---|---|---|
| 8,379,656 B2 | 2/2013 | Waldrop et al. | |
| 8,509,249 B2 | 8/2013 | Waldrop et al. | |
| 8,537,845 B2 | 9/2013 | Waldrop et al. | |
| 8,583,503 B2 | 11/2013 | Waldrop et al. | |
| 8,751,323 B2 | 6/2014 | Waldrop et al. | |
| 8,756,344 B2 | 6/2014 | Waldrop et al. | |
| 9,082,091 B2 | 7/2015 | Doraiswamy et al. | |
| 9,269,061 B2 | 2/2016 | Jeyapaul et al. | |
| 9,467,385 B2 * | 10/2016 | Raney ................. | H04L 47/2441 |

(Continued)

FOREIGN PATENT DOCUMENTS

EP 2720415 A1 4/2014

OTHER PUBLICATIONS

"Enabling Private Virtual Connections for Direct Cloud Access," www.equinix.com/cloud-exchange, Apr. 30, 2014, 2 pp.

(Continued)

*Primary Examiner* — Melvin H Pollack
(74) *Attorney, Agent, or Firm* — Shumaker & Sieffert, P.A.

(57) ABSTRACT

In general, a cloud-based services exchange (or "cloud exchange") for interconnecting multiple cloud service providers with multiple cloud service customers is described. The cloud exchange may enable cloud customers to bypass the public Internet to directly connect to cloud services providers so as to improve performance, reduce costs, increase the security and privacy of the connections, and leverage cloud computing for additional applications. In this way, enterprises, network carriers, and SaaS customers, for instance, can integrate cloud services with their internal applications as if such services are part of or otherwise directly coupled to their own data center network.

29 Claims, 11 Drawing Sheets

(56) References Cited

U.S. PATENT DOCUMENTS

| | | | |
|---|---|---|---|
| 9,485,147 B2* | 11/2016 | Gu | H04L 12/4641 |
| 9,491,121 B2* | 11/2016 | Bao | H04L 49/25 |
| 9,503,321 B2* | 11/2016 | Neginhal | H04L 41/0803 |
| 9,515,947 B1* | 12/2016 | Lowe | H04L 12/4633 |
| 9,563,480 B2* | 2/2017 | Messerli | G06F 9/5072 |
| 9,577,937 B2* | 2/2017 | Vasseur | H04L 12/28 |
| 9,584,421 B2* | 2/2017 | Rai | H04L 47/125 |
| 9,584,439 B2* | 2/2017 | Leafe | H04L 47/781 |
| 2011/0145292 A1 | 6/2011 | Lillie et al. | |
| 2013/0142201 A1 | 6/2013 | Kim et al. | |
| 2015/0341377 A1* | 11/2015 | Kasturi | H04L 63/1416 726/23 |
| 2016/0124742 A1 | 5/2016 | Rangasamy et al. | |
| 2016/0127254 A1 | 5/2016 | Kumar et al. | |
| 2016/0127454 A1 | 5/2016 | Maheshwari et al. | |
| 2016/0294732 A1* | 10/2016 | Chou | H04L 49/25 |
| 2016/0308762 A1* | 10/2016 | Teng | H04L 45/50 |
| 2016/0308766 A1* | 10/2016 | Register | H04L 45/745 |
| 2016/0337474 A1* | 11/2016 | Rao | H04L 41/0806 |
| 2017/0054801 A1* | 2/2017 | Beereddy | H04L 67/1019 |

OTHER PUBLICATIONS

"Equinix Performance Hub and Cloud Exchange," Quick Reference Guide, www.equinix.com, Jul. 1, 2014, 4 pp.
Fang et al., "BGP IP VPN Data Center Interconnect," Internet Draft, draft-fang-l3vpn-data-center-interconnect-00, Feb. 18, 2013, 12 pp.
International Search Report and Written Opinion of International Application No. PCT/US2016/027721, mailed Jul. 21, 2016, 14 pp.
Rosen et al., "BGP/MPLS IP Virtual Private Networks (VPNs)," RFC 4364, Network Working Group, Feb. 2006, 47 pp.

* cited by examiner

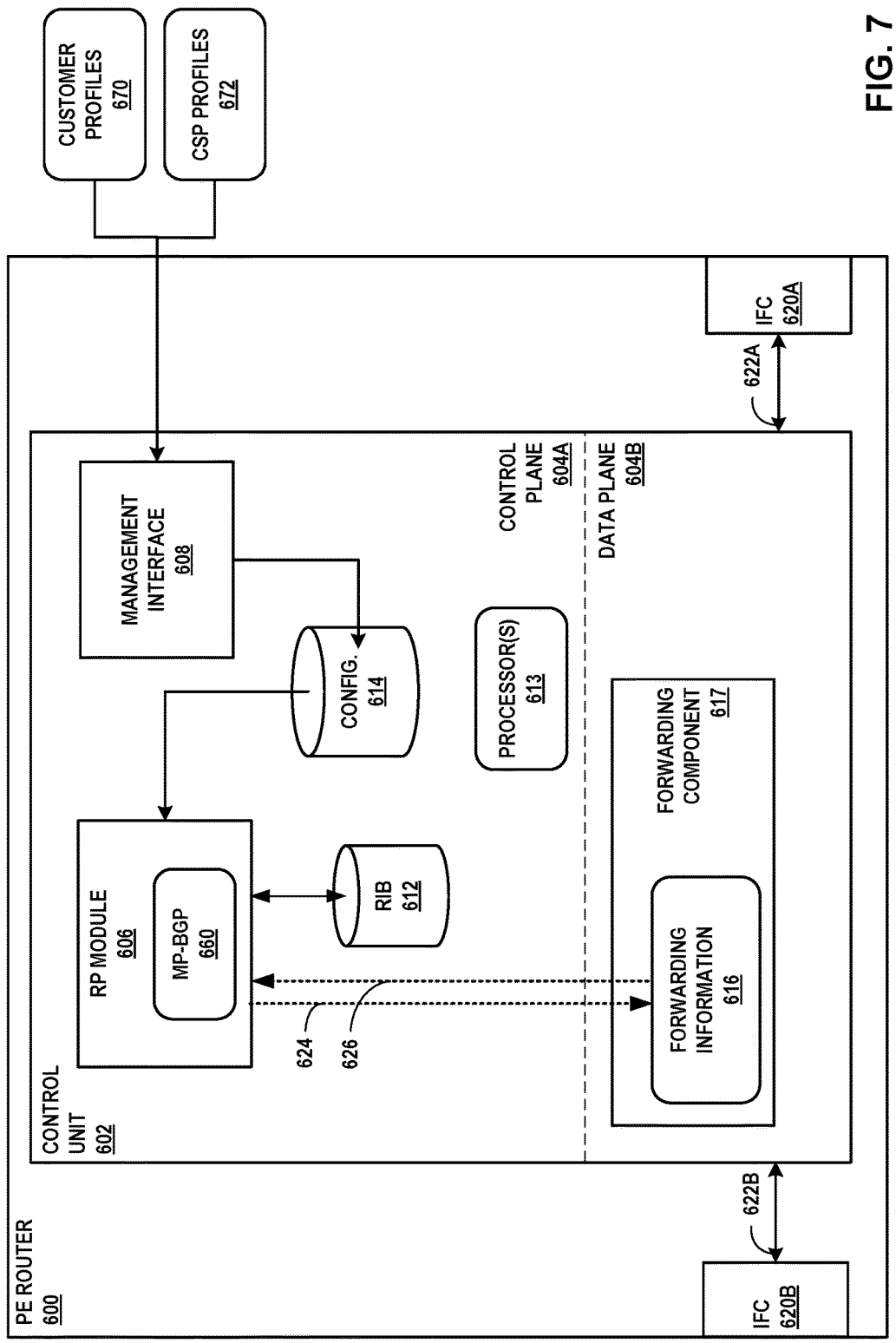

CLOUD-BASED SERVICES EXCHANGE

This application is a continuation of U.S. patent application Ser. No. 15/099,407, filed Apr. 14, 2016 which claims the benefit of U.S. Provisional Patent Application 62/149,374, filed Apr. 17, 2015, each of which are incorporated herein by reference in their respective entireties.

TECHNICAL FIELD

The invention relates to computer networks and, more specifically, to a cloud-based services exchange for interconnecting cloud service customers and cloud service providers.

BACKGROUND

Cloud computing refers to the use of dynamically scalable computing resources accessible via a network, such as the Internet. The computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

SUMMARY

In general, a cloud-based services exchange (or "cloud exchange") for interconnecting multiple cloud service providers with multiple cloud service customers is described. The cloud exchange may enable cloud customers to bypass the public Internet to directly connect to cloud services providers so as to improve performance, reduce costs, increase the security and privacy of the connections, and leverage cloud computing for additional applications. In this way, enterprises, network carriers, and SaaS customers, for instance, can integrate cloud services with their internal applications as if such services are part of or otherwise directly coupled to their own data center network.

In some examples, the cloud exchange provides an advanced interconnection solution enabling IP-based (i.e., layer 3), localized, seamless, on-demand, and direct access to multiple clouds and multiple networks having a global footprint. The cloud exchange may provide private, high-performance connections by customers, such as enterprises and network service providers, with cloud service providers to facilitate direct access to the services with which the customers can build sophisticated private and/or hybrid cloud solutions within a data center-localized cloud exchange.

For instance, a cloud exchange point implemented within a data center may provide a collapsed and metro-based network infrastructure that interconnects multiple cloud service providers and cloud service customers. The cloud exchange point may provide dedicated cloud access to customers, e.g., exclusively to local data center tenants, that obtain and have configured access within the cloud exchange point to public, private, and/or hybrid cloud services. Moreover, the cloud exchange point may aggregate connections to multiple cloud services by aggregating physical links, but also or alternatively based on IP, services, and/or virtual private network (VPN) routing and forwarding instances (VRFs, also known as "VPN routing and forwarding tables").

The cloud exchange point may include a metro-based IP network having a unique autonomous system number with which cloud customers and cloud providers interconnected via the cloud exchange point may exchange routes for virtual private networks. The cloud exchange point routes service traffic within the metro-based IP network so as to avoid transit networks, the service traffic routing being performed within a single data center, for instance. In some instances, the cloud exchange point may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers to customers. In other words, the cloud exchange points may internalize the eBGP peering relationships that cloud service providers and customers would maintain on a pair-wise basis. Instead, a customer may configure a single eBGP peering relationship with a cloud exchange point and receive, via the cloud exchange point, multiple cloud services from one or more cloud service providers.

In this way, the cloud exchange described herein may operate as a cloud exchange provider that provides multiple customers with access to multiple different cloud services. The techniques may in various instances reduce transport costs for IP paths by offering metro-based connectivity within a cloud exchange point having ample switching bandwidth by eschewing wide area network (WAN) links, aggregated cloud access from cloud service providers to a customer and from customers to a cloud service provider within a cloud exchange point, a more reliable and private connection to cloud services in comparison to Internet-based connectivity to cloud services, and improved IP end-to-end paths. Such dedicated cloud access without reliance on Internet-based transport may prevent Internet-based intrusions and other attacks on tenant (e.g., customer, network service provider, and cloud service provider) networks, such as denial-of-service (DoS) attacks. Further, by consolidating connections between multiple cloud providers and cloud customers within a cloud exchange point, the cloud exchange described herein may provide synergies among tenants of the cloud exchange by promoting an eco-system of automated service (inter)connectivity and facilitating new market services within the cloud services community.

In one example, a cloud-based services exchange point comprises a layer three (L3) autonomous system located within a data center, wherein the L3 autonomous system is configured to receive, from each of a plurality of cloud service provider networks, cloud service traffic for at least one cloud service and for distribution to one or more customer networks. The cloud-based services exchange point also comprises a plurality of attachment circuits configured to connect, within the data center, the respective plurality of cloud service provider networks to the L3 autonomous system. The cloud-based services exchange point also comprises one or more attachment circuits configured to connect, within the data center, the respective one or more customer networks to the L3 autonomous system, wherein the L3 autonomous system is configured to interconnect the plurality of cloud service provider networks and the one or more customer networks by establishing end-to-end L3 paths between the plurality of cloud service provider networks and the one or more customer networks, each end-to-end L3 path including one of the plurality of attachment circuits connecting the respective plurality of cloud service provider networks to the L3 autonomous system and also including one of the one or more attachment circuits connecting the respective one or more customer networks to the L3 autonomous system, wherein the L3 autonomous system is configured to forward cloud service traffic, received on the plurality of attachment circuits connecting the respective plurality of cloud service provider networks along the end-to-end L3 paths, to the one or more attachment circuits connecting the respective one or more customer networks to the L3 autonomous system.

In another example, a method comprises: by a layer three (L3) autonomous system of a cloud-based services exchange point and located within a data center, receiving, from each of a plurality of cloud service provider networks, cloud service traffic for at least one cloud service and for distribution to one or more customer networks, wherein a plurality of attachment circuits is configured to connect, within the data center, the respective plurality of cloud service provider networks to the L3 autonomous system, wherein one or more attachment circuits are configured to connect, within the data center, the respective one or more customer networks to the L3 autonomous system. The method also comprises interconnecting, by the L3 autonomous system, the plurality of cloud service provider networks and the one or more customer networks by establishing end-to-end L3 paths between the plurality of cloud service provider networks and the one or more customer networks, each end-to-end L3 path including one of the plurality of attachment circuits connecting the respective plurality of cloud service provider networks to the L3 autonomous system and also including one of the one or more attachment circuits connecting the respective one or more customer networks to the L3 autonomous system. The method also comprises forwarding, by the L3 autonomous system, cloud service traffic, received on the plurality of attachment circuits connecting the respective plurality of cloud service provider networks along the end-to-end L3 paths, to the one or more attachment circuits connecting the respective one or more customer networks to the L3 autonomous system.

In another example, a cloud-based services exchange point comprises an interconnection platform. The cloud-based services exchange point also comprises a layer three (L3) autonomous system located within a data center, wherein the L3 autonomous system is configured to receive, from each of a plurality of cloud service provider networks, cloud service traffic for at least one cloud service and for distribution to one or more customer networks. The cloud-based services exchange point also comprises a plurality of attachment circuits configured to connect, within the data center, the respective plurality of cloud service provider networks to the L3 autonomous system. The cloud-based services exchange point also comprises one or more attachment circuits configured to connect, within the data center, the respective one or more customer networks to the L3 autonomous system, wherein the L3 autonomous system is configured by the interconnection platform to interconnect the plurality of cloud service provider networks and the one or more customer networks by establishing end-to-end L3 paths between the plurality of cloud service provider networks and the one or more customer networks, each end-to-end L3 path including one of the plurality of attachment circuits connecting the respective plurality of cloud service provider networks to the L3 autonomous system and also including one of the one or more attachment circuits connecting the respective one or more customer networks to the L3 autonomous system, wherein the L3 autonomous system is configured by the interconnection platform to forward cloud service traffic, received on the plurality of attachment circuits connecting the respective plurality of cloud service provider networks along the end-to-end L3 paths, to the one or more attachment circuits connecting the respective one or more customer networks to the L3 autonomous system.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 7 is a block diagram illustrating an example router configured to apply techniques described in this disclosure.

Like reference characters denote like elements throughout the figures and text.

DETAILED DESCRIPTION

In general, this disclosure describes a cloud-based services exchange (or "cloud exchange") for interconnecting multiple cloud service providers with multiple cloud service customers is described. The cloud exchange may enable cloud customers to bypass the public Internet to directly connect to cloud services providers (CSPs) so as to improve performance, reduce costs, increase the security and privacy of the connections, and leverage cloud computing for additional applications. The multiple CSPs participate in the cloud exchange by virtue of their having at least one accessible port in the cloud exchange by which a customer can connect to the one or more cloud services offered by the CSPs, respectively.

According to various examples described herein, the cloud exchange may allow private networks of any customer to be directly cross-connected to any other customer at a common point, thereby allowing direct exchange of network traffic between the networks of the customers. Customers may include network carriers (or network service providers), enterprises, and other users of cloud services offered by one or more cloud service providers.

Figure 1:
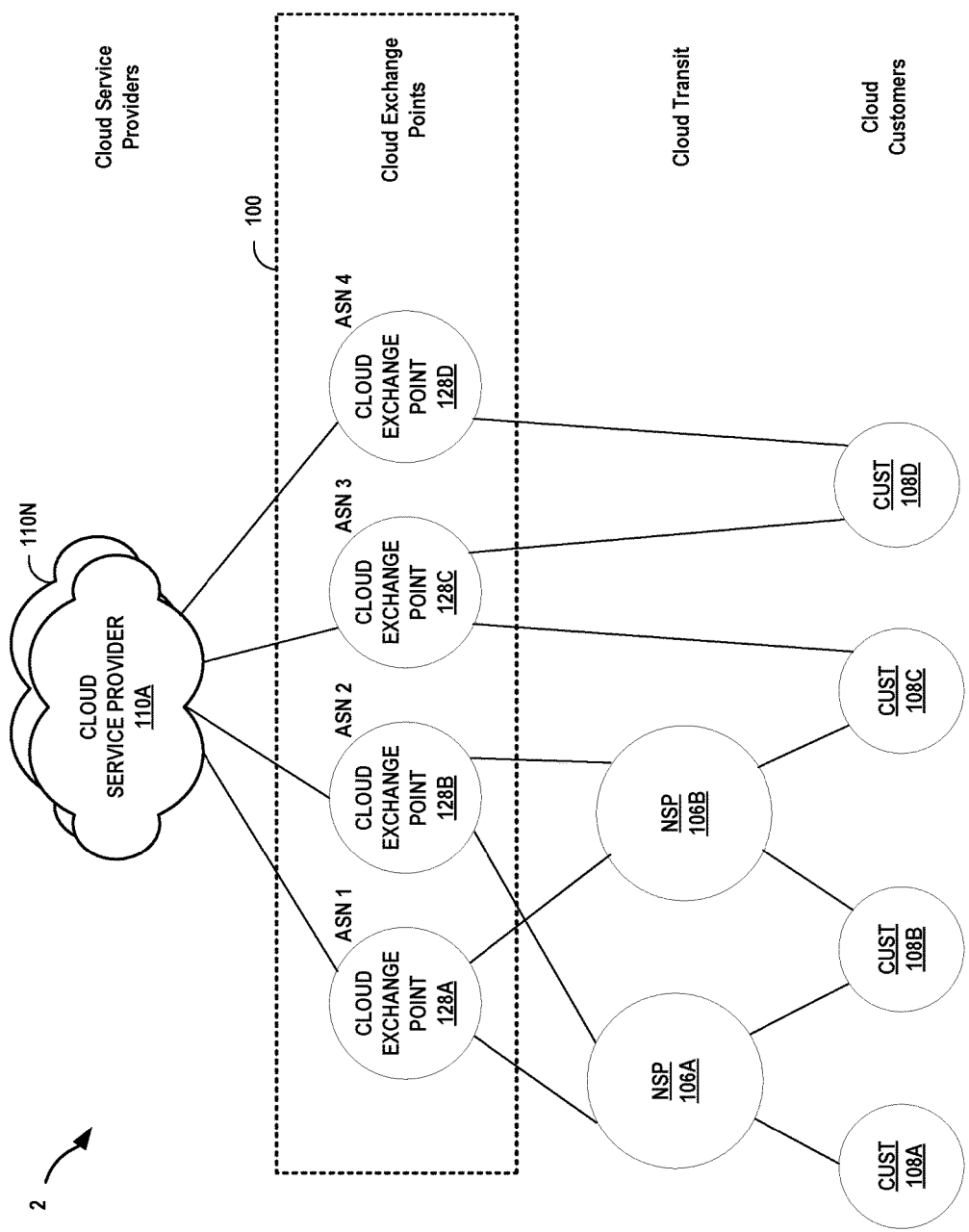
FIG. 1 is a block diagram that illustrates a conceptual view of a network system 2 having a metro-based cloud exchange that provides multiple cloud exchange points according to techniques described herein.

FIG. 1 is a block diagram that illustrates a conceptual view of a network system 2 having a metro-based cloud exchange that provides multiple cloud exchange points according to techniques described herein. Each of cloud-based services exchange points 128A-128D (described hereinafter as "cloud exchange points" and collectively referred to as "cloud exchange points 128") of cloud-based services exchange 100 ("cloud exchange 100") may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent cloud-based services exchange by which cloud-based services customers ("cloud customers") and cloud-based service providers ("cloud providers") connect to receive and provide, respectively, cloud services. In various examples, cloud exchange 100 may include more or fewer cloud exchange points 128. In some instances, a cloud exchange 100 includes just one cloud exchange point 128. As used herein, reference to a "cloud exchange" or "cloud-based services exchange" may refer to a cloud exchange point. A cloud exchange provider may deploy instances of cloud exchanges 100 in multiple different metropolitan areas, each instance of cloud exchange 100 having one or more cloud exchange points 128.

Each of cloud exchange points 128 includes network infrastructure and an operating environment by which cloud customers 108A-108D (collectively, "cloud customers 108") receive cloud services from multiple cloud service providers 110A-110N (collectively, "cloud service providers 110"). Cloud customers 108 may receive cloud services directly via a layer 3 peering and physical connection to one of cloud exchange points 128 or indirectly via one of network service providers 106A-106B (collectively, "NSPs 106," or alternatively, "carriers 106"). NSPs 106 provide "cloud transit" by maintaining a physical presence within one or more of cloud exchange points 128 and aggregating layer 3 access from one or customers 108. NSPs 106 may peer, at layer 3, directly with one or more cloud exchange points 128 and in so doing offer indirect layer 3 connectivity and peering to one or more customers 108 by which customers 108 may obtain cloud services from the cloud exchange 100. Each of cloud exchange points 128, in the example of FIG. 1, is assigned a different autonomous system number (ASN). For example, cloud exchange point 128A is assigned ASN 1, cloud exchange point 128B is assigned ASN 2, and so forth. Each cloud exchange point 128 is thus a next hop in a path vector routing protocol (e.g., BGP) path from cloud service providers 110 to customers 108. As a result, each cloud exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, cloud exchange points 128 may internalize the eBGP peering relationships that cloud service providers 110 and customers 108 would maintain on a pair-wise basis. Instead, a customer 108 may configure a single eBGP peering relationship with a cloud exchange point 128 and receive, via the cloud exchange, multiple cloud services from one or more cloud service providers 110. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 108D is illustrated as having contracted with a cloud exchange provider for cloud exchange 100 to directly access layer 3 cloud services via cloud exchange points 128C, 128D. In this way, customer 108D receives redundant layer 3 connectivity to cloud service provider 110A, for instance. Customer 108C, in contrast, is illustrated as having contracted with the cloud exchange provider for cloud exchange 100 to directly access layer 3 cloud services via cloud exchange point 128C and also to have contracted with NSP 106B to access layer 3 cloud services via a transit network of the NSP 106B. Customer 108B is illustrated as having contracted with multiple NSPs 106A, 106B to have redundant cloud access to cloud exchange points 128A, 128B via respective transit networks of the NSPs 106A, 106B. The contracts described above are instantiated in network infrastructure of the cloud exchange points 128 by L3 peering configurations within switching devices of NSPs 106 and cloud exchange points 128 and L3 connections, e.g., layer 3 virtual circuits, established within cloud exchange points 128 to interconnect cloud service provider 110 networks to NSPs 106 networks and customer 108 networks, all having at least one port offering connectivity within one or more of the cloud exchange points 128.

Figure 2:
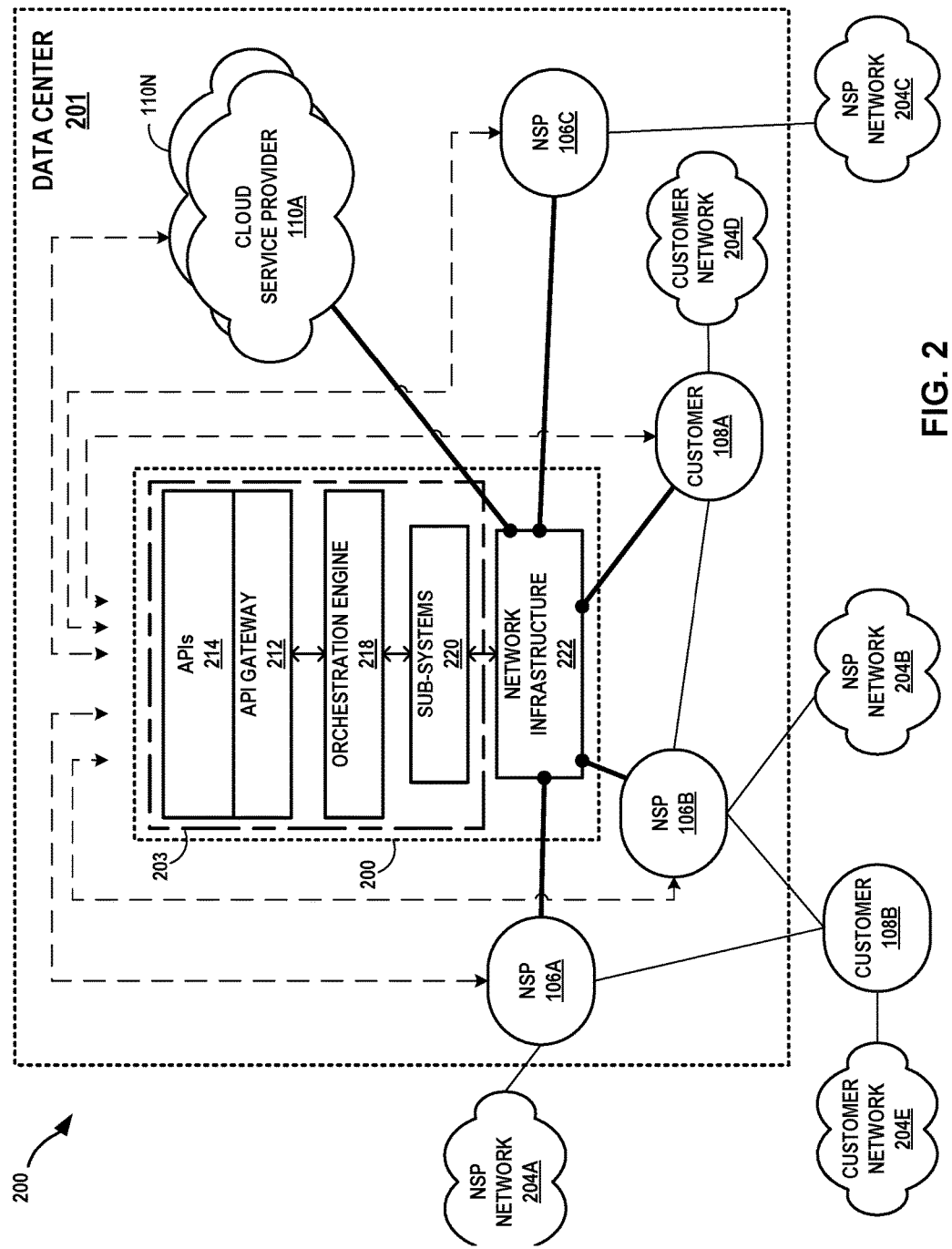
FIG. 2 is a block diagram illustrating a high-level view of a data center that provides an operating environment for a cloud-based services exchange, according to techniques described herein.

FIG. 2 is a block diagram illustrating a high-level view of a data center 201 that provides an operating environment for a cloud-based services exchange 200, according to techniques described herein. Cloud-based services exchange 200 ("cloud exchange 200") allows a corresponding one of customer networks 204D, 204E and NSP networks 204A-204C (collectively, "'private' or 'carrier' networks 204") of any NSPs 106A-106C or other cloud customers including customers 107A, 107B to be directly cross-connected, via a layer 3 (L3) or layer 2 (L2) connection to any other customer network and/or to any of cloud service providers 110A-110N, thereby allowing exchange of cloud service traffic among the customer networks and CSPs 110. Data center 201 may be entirely located within a centralized area, such as a warehouse or localized data center complex, and provide power, cabling, security, and other services to NSPs, customers, and cloud service providers that locate their respective networks within the data center 201 (e.g., for co-location) and/or connect to the data center 201 by one or more external links.

Network service providers 106 may each represent a network service provider that is associated with a transit network by which network subscribers of the NSP 106 may access cloud services offered by CSPs 110 via the cloud exchange 200. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 200.

In this way, cloud exchange 200 streamlines and simplifies the process of partnering CSPs 110 and customers 108 (indirectly via NSPs 106 or directly) in a transparent and neutral manner. One example application of cloud exchange 200 is a co-location and interconnection data center in which CSPs 110, NSPs 106 and/or customers 108 may already have network presence, such as by having one or more accessible ports available for interconnection within the data center. This allows the participating carriers, customers, and CSPs to have a wide range of interconnectivity options in the same facility. Cloud exchange 200 of data center 101 includes network infrastructure 122 that provides a L2/L3 switching fabric by which CSPs 110 and customers/NSPs interconnect. This enables an NSP/customer to have options to create many-to-many interconnections with only a one-time hook up to the switching network and underlying network infrastructure 222 that presents an interconnection platform for cloud exchange 200. In other words, instead of having to establish separate connections across transit networks to access different cloud service providers or different cloud services of one or more cloud service providers, cloud exchange 200 allows customers to interconnect to multiple CSPs and cloud services using network infrastructure 222 within data center 201.

By being connected to and utilizing cloud exchange 200, customers can purchase services and reach out to many end users in many different geographical areas without incurring the same expenses typically associated with installing and maintaining multiple virtual connections with multiple CSPs 110. For example, NSP 106A can expand its services using network 204B of NSP 106B. By connecting to cloud exchange 200, a NSP 106 may be able to generate additional revenue by offering to sell its network services to the other carriers. For example, NSP 106C can offer the opportunity to use NSP network 204C to the other NSPs.

In some example implementations described herein, cloud exchange 200 includes an interconnection platform 203 that exposes a collection of software interfaces, which may include in some examples and are alternatively referred to herein as application programming interfaces (APIs) 214 in that the APIs 214 define the methods, fields, and/or other software primitives by which applications may invoke the interconnection platform 203. The software interfaces allow NSPs 206 and customers 108 programmable access to capabilities and assets of the cloud exchange 200. The interconnection platform 203 may alternatively be referred to as a controller, provisioning platform, service orchestration system, provisioning system, etc., for establishing connectivity between customers and cloud service providers according to techniques described herein.

On the buyer side, the software interfaces presented by the underlying interconnect platform provide an extensible framework that allows software developers associated with the customers of cloud exchange 200 (e.g., customers 108 and NSPs 206) to create software applications that allow and leverage access to the interconnect platform by which the applications may request that the cloud exchange 200 establish connectivity between the customer and cloud services offered by any of the CSPs 110. For example, these buyer-side software interfaces (or "buyer APIs" of APIs 214) may allow customer applications for NSPs and enterprise customers, e.g., to obtain authorization to access the cloud exchange, obtain information regarding available cloud services, obtain active ports and metro area details for the customer, create virtual circuits of varying bandwidth to access cloud services, including dynamic selection of bandwidth based on a purchased cloud service to create on-demand and need based virtual circuits to cloud service providers, delete virtual circuits, obtain active virtual circuit information, obtain details surrounding CSPs partnered with the cloud exchange provider, obtain customized analytics data, and validate partner access to interconnection assets.

On the cloud service provider (seller) side, the software interfaces may allow software developers associated with cloud providers to manage their cloud services and to enable customers to connect to their cloud services. For example, these seller-side software interfaces (or "seller APIs" of APIs 214) may allow cloud service provider applications to obtain authorization to access the cloud exchange, obtain information regarding available cloud services, obtain active ports and metro area details for the provider, obtain active port details in a given data center for the provider, approve or reject virtual circuits of varying bandwidth to access cloud services created by customers, obtain virtual circuits pending addition and confirm addition of virtual circuits, obtain virtual circuits pending deletion and confirm deletion of virtual circuits, obtain customized analytics data, and validate partner access to interconnection assets.

As further described herein, the APIs 114 facilitate machine-to-machine communication to enable dynamic provisioning of virtual circuits in the cloud exchange for interconnecting customer and provider networks. In this way, the interconnection platform 203 enables the automation of aspects of cloud services provisioning. For example, the software interfaces may provide an automated and seamless way for customers to establish, de-install and manage interconnection with multiple, different cloud providers participating in the cloud exchange.

In some examples, cloud exchange 200 includes an API gateway 212 that executes one or more applications that expose software interfaces defined according to APIs 214. The applications may invoke services that correspond to endpoints of the APIs 214, and the services may themselves invoke the cloud exchange platform service of orchestration engine 218. API gateway 212 may execute on one or virtual machines and/or real servers of data center 201.

In some examples, cloud exchange includes an orchestration engine 218 that organizes, directs and integrates underlying software sub-systems 220 for managing various aspects of interconnection within the network infrastructure 222 as well as cloud services management. The orchestration engine 218 may, for example, provide a rule-drive workflow engine that operates between the APIs 214 and the underlying interconnect platform of cloud exchange 200 that includes sub-systems 220 and network infrastructure 222. In this way, the orchestration engine 218 can be used by customer-proprietary applications and the APIs 214 for direct participation with the interconnection platform 203 of the cloud exchange 200. In other words, the orchestration engine 218 offers a "cloud exchange platform service" having various application engines to handle the API gateway 212 service requests.

As described in further detail below, sub-systems 220 may offer "cloud exchange services" invokable by orchestration engine 218. Sub-systems 220 and orchestration engine 218 may each be centralized or distributed applications and may execute on one or virtual machines and/or real servers of data center 201. Sub-systems 220 may include one or more sub-systems that configure routes, VRFs, VPNs, route targets, et al., within routing and switching devices of network infrastructure 222 so as to facilitate cloud exchange services with end-to-end layer 3 path provisioning.

In the example of FIG. 2, network infrastructure 222 represents the cloud exchange switching fabric and includes multiple ports that may be dynamically interconnected with virtual circuits by, e.g., invoking APIs 214 of the interconnection platform 203. Each of the ports is associated with one of carriers 106, customers 108, and CSPs 110. Additional details of an example interconnection platform are described in U.S. Provisional Appl. No. 62/072,976, filed Oct. 30, 2014, entitled "INTERCONNECTION PLATFORM FOR REAL-TIME CONFIGURATION AND MANAGEMENT OF A CLOUD-BASED SERVICES EXCHANGE," the entire content of which is incorporated by reference herein.

Figure 3A:
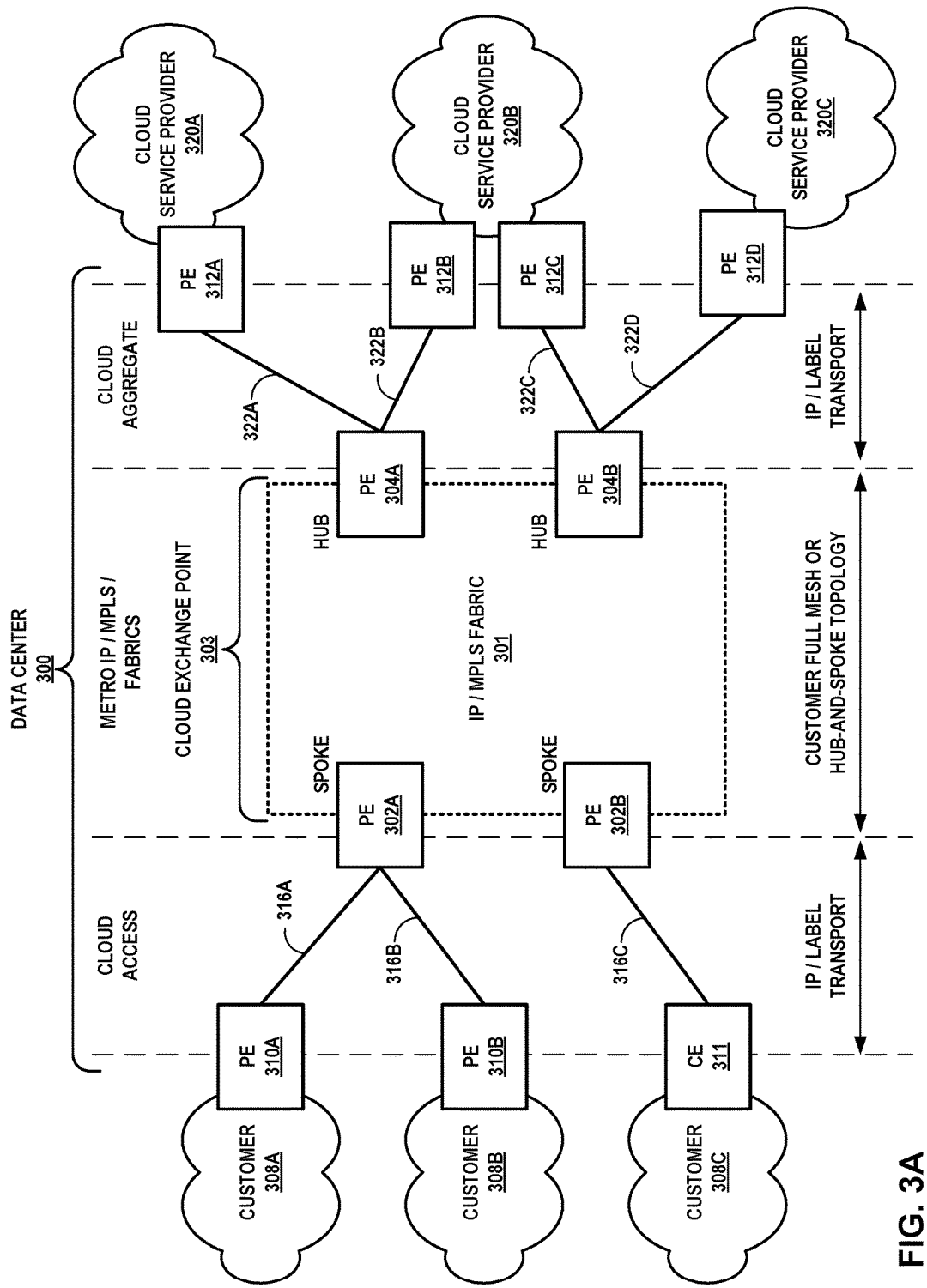
FIGS. 3A-3B are block diagrams illustrating example network infrastructure for a cloud exchange that aggregates the cloud services of multiple cloud service providers for provisioning to customers of the cloud exchange provider and aggregates access for multiple customers to one or more cloud service providers, in accordance with techniques described in this disclosure.
Figure 3B:
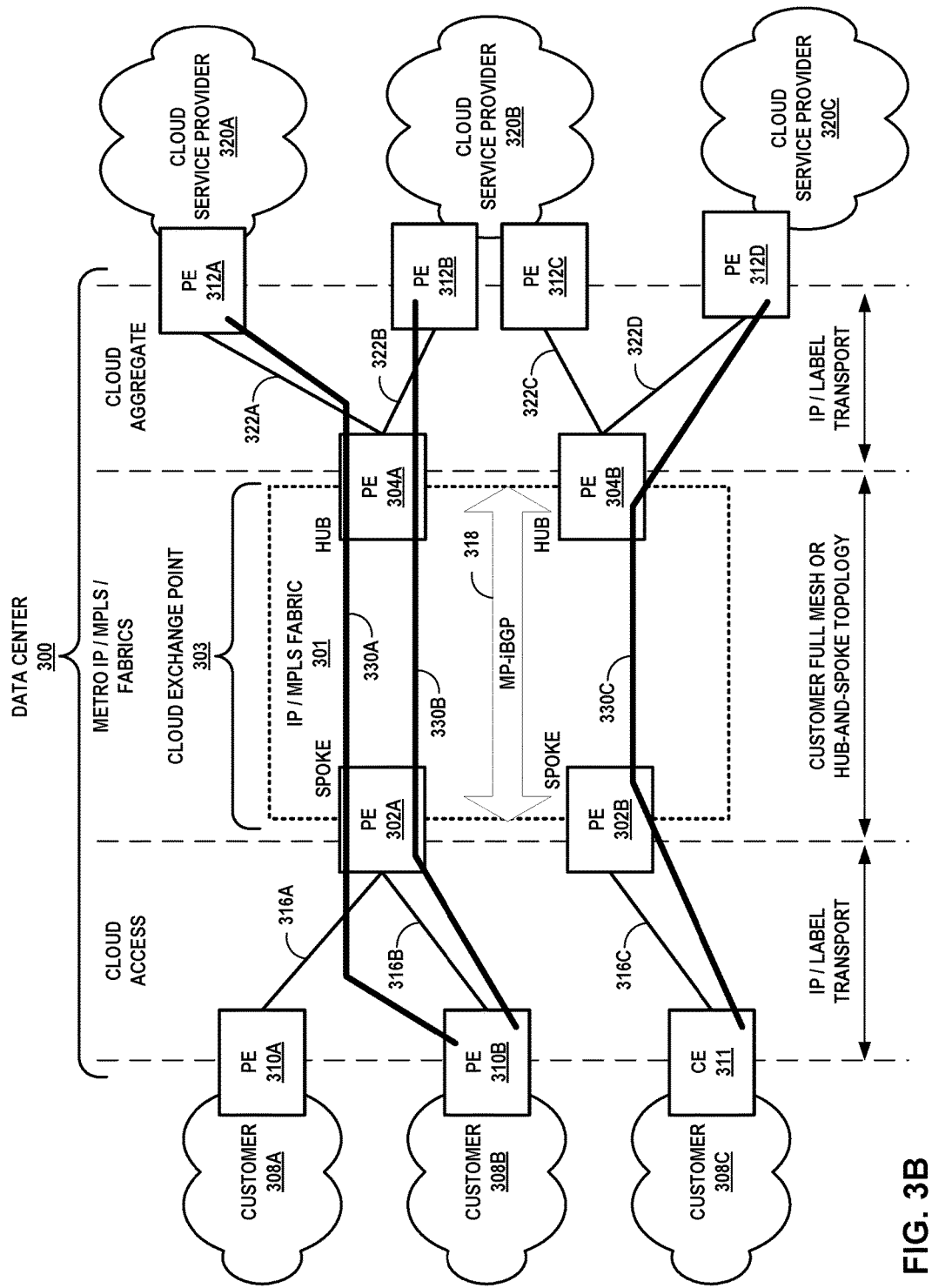

FIGS. 3A-3B are block diagrams illustrating example network infrastructure for a cloud exchange that aggregates the cloud services of multiple cloud service providers for provisioning to customers of the cloud exchange provider and aggregates access for multiple customers to one or more cloud service providers, in accordance with techniques described in this disclosure. In this example, customer networks 308A-308C (collectively, "customer networks 308"), each associated with a different customer, access a cloud exchange point within a data center 300 in order receive aggregated cloud services from one or more cloud service provider networks 320, each associated with a different cloud service provider 110. Customer networks 308 each include endpoint devices that consume cloud services provided by cloud service provider network 320. Example endpoint devices include servers, smart phones, television set-top boxes, workstations, laptop/tablet computers, video gaming systems, teleconferencing systems, media players, and so forth.

Customer networks 308A-308B include respective provider edge/autonomous system border routers (PE/ASBRs) 310A-310B. Each of PE/ASBRs 310A, 310B may execute exterior gateway routing protocols to peer with one of PE routers 302A-302B ("PE routers 302" or more simply "PEs 302") over one of access links 316A-316B (collectively, "access links 316"). In the illustrated examples, each of access links 316 represents a transit link between an edge router of a customer network 308 and an edge router (or autonomous system border router) of cloud exchange point 303. For example, PE 310A and PE 302A may directly peer via an exterior gateway protocol, e.g., exterior BGP, to exchange L3 routes over access link 316A and to exchange L3 data traffic between customer network 308A and cloud service provider networks 320. Access links 316 may in some cases represent and alternatively be referred to as attachment circuits for IP-VPNs configured in IP/MPLS fabric 301, as described in further detail below. Access links 316 may in some cases each include a direct physical connection between at least one port of a customer network 308 and at least one port of cloud exchange point 303, with no intervening transit network. Access links 316 may operate over a VLAN or a stacked VLAN (e.g, QinQ), a VxLAN, an LSP, a GRE tunnel, or other type of tunnel.

While illustrated and primarily described with respect to L3 connectivity, PE routers 302 may additionally offer, via access links 316, L2 connectivity between customer networks 308 and cloud service provider networks 320. For example, a port of PE router 302A may be configured with an L2 interface that provides, to customer network 308A, L2 connectivity to cloud service provider 320A via access link 316A, with the cloud service provider 320A router 312A coupled to a port of PE router 304A that is also configured with an L2 interface. The port of PE router 302A may be additionally configured with an L3 interface that provides, to customer network 308A, L3 connectivity to cloud service provider 320B via access links 316A. PE 302A may be configured with multiple L2 and/or L3 sub-interfaces such that customer 308A may be provided, by the cloud exchange provider, with a one-to-many connection to multiple cloud service providers 320.

To create an L2 interconnection between a customer network 308 and a cloud service provider network 320, in some examples, IP/MPLS fabric 301 is configured with an L2 bridge domain (e.g., an L2 virtual private network (L2VPN) such as a virtual private LAN service (VPLS), E-LINE, or E-LAN) to bridge L2 traffic between a customer-facing port of PEs 302 and a CSP-facing port of cloud service providers 320. In some cases, a cloud service provider 320 and customer 308 may have access links to the same PE router 302, 304, which bridges the L2 traffic using the bridge domain.

To create an L3 interconnection between a customer network 308 and a cloud service provider network 320, in some examples, IP/MPLS fabric 301 is configured with a L3 virtual routing and forwarding instances (VRFs), as described in further detail below with respect to FIG. 4.

In some examples of a cloud exchange point 303, any of access links 316 and aggregation links 322 may represent Network-to-Network Interface (NNI) links. Additional details of NNI links and provisioning of NNI links to facilitate layer 2 connectivity within a data center 300 are found in U.S. Pat. No. 8,537,845, issued Sep. 17, 2013, and entitled "Real time configuration and provisioning for a carrier Ethernet exchange," which is incorporated by reference herein in its entirety.

In this example, customer network 308C is not an autonomous system having an autonomous system number. Customer network 308C may represent an enterprise, network service provider, or other customer network that is within the routing footprint of the cloud exchange point. Customer network includes a customer edge (CE) device 311 that may execute exterior gateway routing protocols to peer with PE router 302B over access link 316C. In various examples, any of PEs 310A-310B may alternatively be or otherwise represent CE devices.

Access links 316 include physical links and may include one or more intermediate switching devices. PE/ASBRs 310A-310B, CE device 311, and PE routers 302A-302B exchange L2/L3 packets via access links 316. In this respect, access links 316 constitute transport links for cloud access via cloud exchange point 303. Cloud exchange point 303 may represent an example of any of cloud exchange points 128. Data center 300 may represent an example of data center 201.

Cloud exchange point 303, in some examples, aggregates customers 308 access to the cloud exchange point 303 and thence to any one or more cloud service providers 320. FIGS. 3A-3B, e.g., illustrate access links 316A-316B connecting respective customer networks 308A-308B to PE router 302A of cloud exchange point 303 and access link 316C connecting customer network 308C to PE router 302B. Any one or more of PE routers 302, 304 may comprise ASBRs. PE routers 302, 304 and IP/MPLS fabric 301 may be configured according to techniques described herein to interconnect any of access links 316 to any of cloud aggregation links 322. As a result, cloud service provider network 320A, e.g., needs only to have configured a single cloud aggregate link (here, access link 322A) in order to provide services to multiple customer networks 308. That is, the cloud service provider operating cloud service provider network 302A does not need to provision and configure separate service links from cloud service provider network 302A to each of PE routers 310, 311, for instance, in order to provide services to each of customer network 308. Cloud exchange point 303 may instead cross-connect cloud aggregation link 322A and PE 312A of cloud service provider network 320A to multiple cloud access links 316 to provide layer 3 peering and network reachability for the cloud services delivery.

In addition, a single customer network, e.g., customer network 308A, need only to have configured a single cloud access link (here, access link 316A) to the cloud exchange point 303 within data center 300 in order to obtain services from multiple cloud service provider networks 320 offering cloud services via the cloud exchange point 303. That is, the customer or network service provider operating customer network 308A does not need to provision and configure separate service links connecting customer network 308A to different PE routers 312, for instance, in order to obtain services from multiple cloud service provider networks 320. Cloud exchange point 303 may instead cross-connect cloud access link 316A (again, as one example) to multiple cloud aggregation links 322 to provide layer 3 peering and network reachability for the cloud services delivery to customer network 308A.

Cloud service provider networks 320 each includes servers configured to provide one or more cloud services to users. These services may be categorized according to service types, which may include for examples, applications/software, platforms, infrastructure, virtualization, and servers and data storage. Example cloud services may include content/media delivery, cloud-based storage, cloud computing, online gaming, IT services, etc.

Cloud service provider networks 320 include PE routers 312A-312D that each executes an exterior gateway routing protocol, e.g., eBGP, to exchange routes with PE routers 304A-304B (collectively, "PE routers 304") of cloud exchange point 303. Each of cloud service provider networks 320 may represent a public, private, or hybrid cloud. Each of cloud service provider networks 320 may have an assigned autonomous system number or be part of the autonomous system footprint of cloud exchange point 303.

In the illustrated example, an Internet Protocol/Multiprotocol label switching (IP/MPLS) fabric 301 interconnects PEs 302 and PEs 304. IP/MPLS fabric 301 include one or more switching and routing devices, including PEs 302, 304, that provide IP/MPLS switching and routing of IP packets to form an IP backbone. In some example, IP/MPLS fabric 301 may implement one or more different tunneling protocols (i.e., other than MPLS) to route traffic among PE routers and/or associate the traffic with different IP-VPNs. In accordance with techniques described herein, IP/MPLS fabric 301 implement IP virtual private networks (IP-VPNs) to connect any of customers 308 with multiple cloud service provider networks 320 to provide a data center-based 'transport' and layer 3 cross-connect. Whereas service provider-based IP backbone networks require wide-area network (WAN) connections with limited bandwidth to transport service traffic from layer 3 services providers to customers, the cloud exchange point 303 as described herein 'transports' service traffic and cross-connects cloud service providers 320 to customers 308 within the high-bandwidth local environment of data center 300 provided by a data center-based IP/MPLS fabric 301. In some examples, IP/MPLS fabric 301 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein. In some example configurations, a customer network 308 and cloud service provider network 320 may connect via respective links to the same PE router of IP/MPLS fabric 301.

Access links 316 and aggregation links 322 may include attachment circuits that associate traffic, exchanged with the connected customer network 308 or cloud service provider network 320, with virtual routing and forwarding instances (VRFs) configured in PEs 302, 304 and corresponding to IP-VPNs operating over IP/MPLS fabric 301. For example, PE 302A may exchange IP packets with PE 310A on a bidirectional label-switched path (LSP) operating over access link 316A, the LSP being an attachment circuit for a VRF configured in PE 302A. As another example, PE 304A may exchange IP packets with PE 312A on a bidirectional label-switched path (LSP) operating over cloud aggregation link 322A, the LSP being an attachment circuit for a VRF configured in PE 304A. Each VRF may include or represent a different routing and forwarding table with distinct routes.

PE routers 302, 304 of IP/MPLS fabric 301 may be configured in respective hub-and-spoke arrangements for cloud services, with PEs 304 implementing cloud service hubs and PEs 302 being configured as spokes of the hubs (for various hub-and-spoke instances/arrangements). A hub-and-spoke arrangement ensures that service traffic is enabled to flow between a hub PE and any of the spoke PEs, but not between different spoke PEs. Hub-and-spoke VPNs may in this way enable complete separation between customer networks 308 and CSP networks 320. As described further below, in a hub-and-spoke arrangement for data center-based IP/MPLS fabric 301 and for southbound service traffic (i.e., from a CSP to a customer) PEs 302 advertise routes, received from PEs 310, to PEs 304, which advertise the routes to PEs 312. For northbound service traffic (i.e., from a customer to a CSP), PEs 304 advertise routes, received from PEs 312, to PEs 302, which advertise the routes to PEs 310. As used herein, a hub VRF exports routes having an "up" route target (RT) while a spoke VRF imports routes having an "up" route target. Conversely, a spoke VRF exports routes having a "down" route target while a hub VRF imports routes having a "down" route target. In some examples, each VRF instance has a unique route distinguisher (RD).

For some customers of cloud exchange point 303, the cloud exchange point 303 provider may configure a full mesh arrangement whereby a set of PEs 302, 304 each couple to a different customer site network for the customer. In such cases, the IP/MPLS fabric 301 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN.

PE routers may couple to one another according to a peer model without use of overlay networks. That is, PEs 310 and PEs 312 may not peer directly with one another to exchange routes, but rather indirectly exchange routes via IP/MPLS fabric 301. In the example of FIG. 3B, cloud exchange point 303 is configured to implement multiple layer 3 virtual circuits 330A-330C (collectively, "virtual circuits 330") to interconnect customer network 308 and cloud service provider networks 322 with end-to-end IP paths. Each of cloud service providers 320 and customers 308 may be an endpoint for multiple virtual circuits 330, with multiple virtual circuits 330 traversing one or more attachment circuits between a PE/PE or PE/CE pair for the IP/MPLS fabric 301 and the CSP/customer. A virtual circuit 330 may represents a layer 3 path through IP/MPLS fabric 301 between an attachment circuit connecting a customer network to the fabric 301 and an attachment circuit connecting a cloud service provider network to the fabric 301. Each virtual circuit 330 may include at least one tunnel (e.g., an LSP and/or Generic Route Encapsulation (GRE) tunnel) having endpoints at PEs 302, 304. PEs 302, 304 may establish a full mesh of tunnels interconnecting one another.

Each virtual circuit 330 may include a different hub-and-spoke network configured in IP/MPLS network 301 having PE routers 302, 304 exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual circuit 330A, PE router 312A of cloud service provider network 320A may send a route for cloud service provider network 320A to PE 304A via a routing protocol (e.g., eBGP) peering connection with PE 304A. PE 304A associates the route with a hub-and-spoke network, which may have an associated VRF, that includes spoke PE router 302A. PE 304A then exports the route to PE router 302A; PE router 304A may export the route specifying PE router 304A as the next hop router, along with a label identifying the hub-and-spoke network. PE router 302A sends the route to PE router 310B via a routing protocol connection with PE 310B. PE router 302A may send the route after adding an autonomous system number of the cloud exchange point 303 (e.g., to a BGP autonomous system path (AS_PATH) attribute) and specifying PE router 302A as the next hop router. Cloud exchange point 303 is thus an autonomous system "hop" in the path of the autonomous systems from customers 308 to cloud service providers 320 (and vice-versa), even though the cloud exchange point 303 may be based within a data center. PE router 310B installs the route to a routing database, such as a BGP routing information base (RIB) to provide layer 3 reachability to cloud service provider network 320A. In this way, cloud exchange point 303 "leaks" routes from cloud service provider networks 320 to customer networks 308, without cloud service provider networks 320 to customer networks 308 requiring a direct layer peering connection.

PE routers 310B, 302A, 304A, and 312A may perform a similar operation in the reverse direction to forward routes originated by customer network 308B to PE 312A and thus provide connectivity from cloud service provider network 320A to customer network 308B. In the example of virtual circuit 330B, PE routers 312B, 304A, 302A, and 310B exchange routes for customer network 308B and cloud service provider 320B in a manner similar to that described above for establishing virtual circuit 330B. As a result, cloud exchange point 303 within data center 300 internalizes the peering connections that would otherwise be established between PE 310B and each of PEs 312A, 312B so as to perform cloud aggregation for multiple layer 3 cloud services provided by different cloud service provider networks 320A, 320B and deliver the multiple, aggregated layer 3 cloud services to a customer network 308B having a single access link 316B to the cloud exchange point 303. Absent the techniques described herein, fully interconnecting customer networks 308 and cloud service provider networks 320 would require 3×3 peering connections between each of PEs 310 and at least one of PEs 312 for each of cloud service provider networks 320. For instance, PE 310A would require a layer 3 peering connection with each of PEs 312. With the techniques described herein, cloud exchange point 303 may fully interconnect customer networks 308 and cloud service provider networks 320 with one peering connection per site PE (i.e., for each of PEs 310 and PEs 312) by internalizing the layer 3 peering and providing data center-based 'transport' between cloud access and cloud aggregate interfaces.

In examples in which IP/MPLS fabric 301 implements BGP/MPLS IP-VPNs or other IP VPNs that use route targets to control route distribution within the IP backbone, PEs 304 may be configured to import routes from PEs 302 and to export routes received from PEs 312, using different asymmetric route targets. Likewise, PEs 302 may be configured to import routes from PEs 304 and to export routes received from PEs 310 using the asymmetric route targets. Thus, PEs 302, 304 may configured to implement advanced L3VPNs that each includes a basic backbone L3VPN of IP/MPLS fabric 301 together with extranets of any of customer networks 308 and any of cloud service provider networks 320 attached to the basic backbone L3VPN. Each advanced L3VPN constitutes a cloud service delivery network from a cloud service provider network 320 to one or more customer networks 308, and vice-versa. In this way, cloud exchange point 303 enables any cloud service provider network 320 to exchange cloud service traffic with any customer network 308 while internalizing the layer 3 routing protocol peering connections that would otherwise be established between pairs of customer networks 308 and cloud service provider networks 320 for any cloud service connection between a given pair. In other words, the cloud exchange point 303 allows each of customer networks 308 and cloud service provider networks 320 to establish a single (or more for redundancy or other reasons) layer 3 routing protocol peering connection to the data center-based layer 3 cross-connect. By filtering routes from cloud service provider networks 320 to customer networks 308, and vice-versa, PEs 302, 304 thereby control the establishment of virtual circuits 330 and the flow of associated cloud service traffic between customer networks 308 and cloud service provider networks 320 within a data center 300. Routes distributed into MP-iBGP mesh 318 may be VPN-IPv4 routes and be associated with route distinguishers to distinguish routes from different sites having overlapping address spaces.

Figure 4:
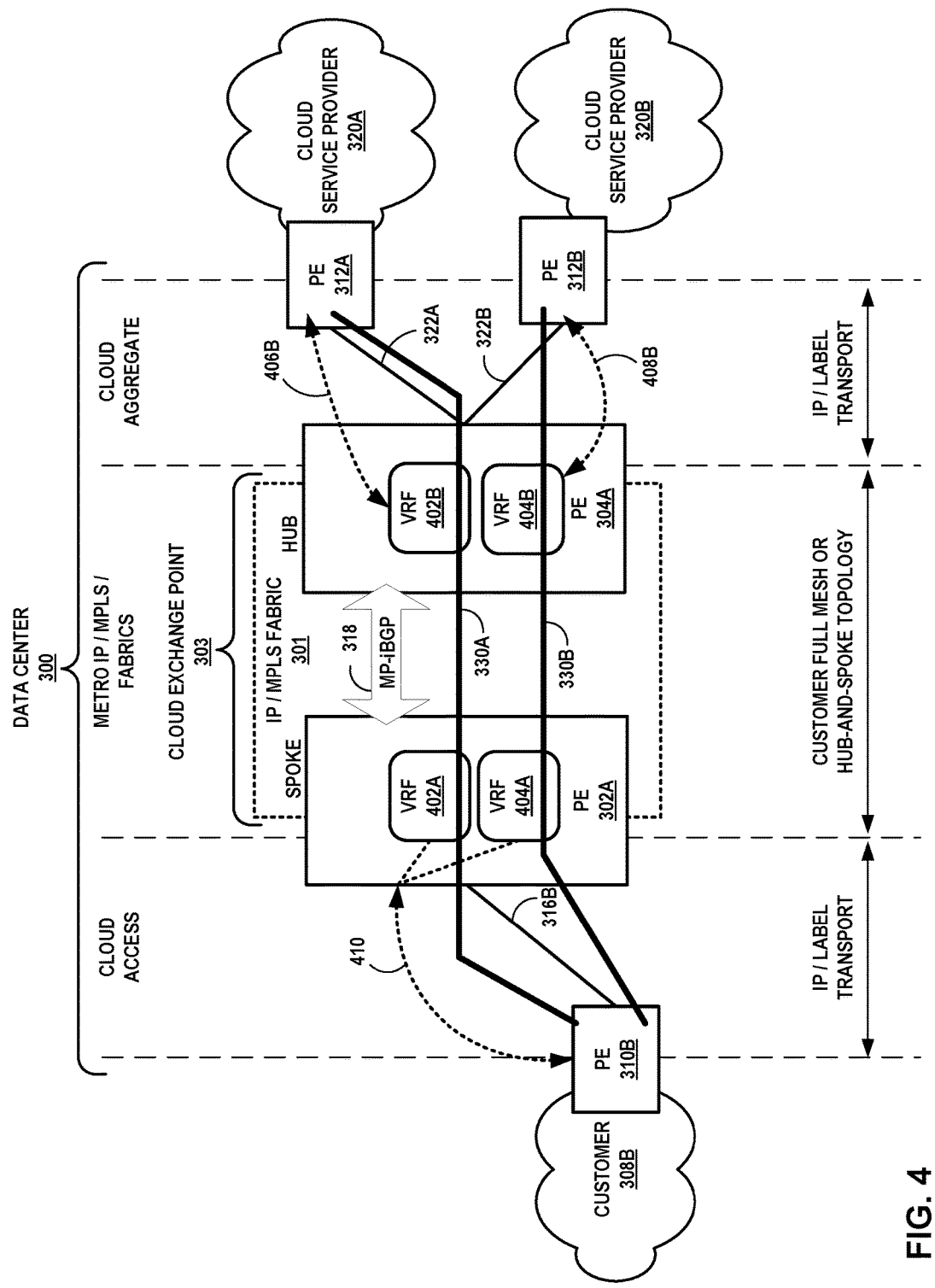
FIG. 4 is a block diagram illustrating an example of a data center-based cloud exchange point in which routers of the cloud exchange point are configured with VPN routing and forwarding instances for routing and forwarding aggregated service traffic from multiple cloud service provider networks to a customer network, according to techniques described herein.

FIG. 4 is a block diagram illustrating an example of a data center-based cloud exchange point in which routers of the cloud exchange point are configured with VPN routing and forwarding instances for routing and forwarding aggregated service traffic from multiple cloud service provider networks to a customer network, according to techniques described herein. In this example, to establish virtual circuits 330A-330B, PE routers 302A and 304A of IP/MPLS fabric 301 are configured with VRFs. PE 302A is configured with VRFs 402A and 404A, while PE 304A is configured with VRFs 402B and 404B. VRF 402A is configured to import routes exported by VRF 402B, and VRF 402B is configured to import routes exported by VRF 402A. The configuration may include asymmetric route targets for import/export between VRFs 402A, 402B. VRF 404A is configured to import routes exported by VRF 402B, and VRF 402B is configured to import routes exported by VRF 402A. The configuration may include asymmetric route targets for import/export between VRFs 402A, 402B. This configuration whereby a customer is able to access multiple layer 3 services from different CSPs each associated with separate VRFs to access the layer 3 services provides isolation of respective traffic exchanged with the CSPs. In some examples, PE 302A may be configured with a single VRF to import routes exported by both VRF 402B and VRF 404B. As noted above with respect to FIGS. 3A-3B, PEs 302, 304 may be further configured to bridge layer 2 traffic between customer 308B and cloud service providers 320.

In this example, PE 304A operates BGP or other route distribution protocol peering connections 406B, 408B with respective PEs 312A, 312B to exchange routes with respective cloud service provider networks 320A, 320B. PE 302A operates a BGP or other route distribution protocol peering connection 410 with PE 310B to exchange routes with customer network 308B. In some examples, as described further below with respect to FIG. 5, PEs 302A, 304A may be statically configured with routes for the site networks.

An administrator for cloud exchange point 303 may configure PEs 302A, 304A with the VRF 402A-402B, 404A-404B in order to leak routes between PEs 312 and PE 310B and facilitate layer 3 connectivity for end-to-end IP paths illustrated here by virtual circuits 330, while potentially optimizing the end-to-end IP paths by fostering data center-based or at least metro-based connectivity. Cloud exchange point 303 may thus provide dedicated cloud service provider access to customer network 308B by way of private and/or public routes for the cloud service provider networks 320. In the northbound direction, cloud exchange point 303 may provide dedicated cloud service provider distribution to multiple customer networks 308 by way of private and/or public routes for the customer networks 308. Neither PE 310B nor any of PEs 302A, 304A need access to the full Internet BGP routing table in order to reach cloud service provider networks 320 or customer networks 308. Moreover, PEs 302A, 304A may be configured to aggregate customer/CSP routes and/or service traffic based on any one or more of physical, IP, service, and VRFs.

Figure 5:
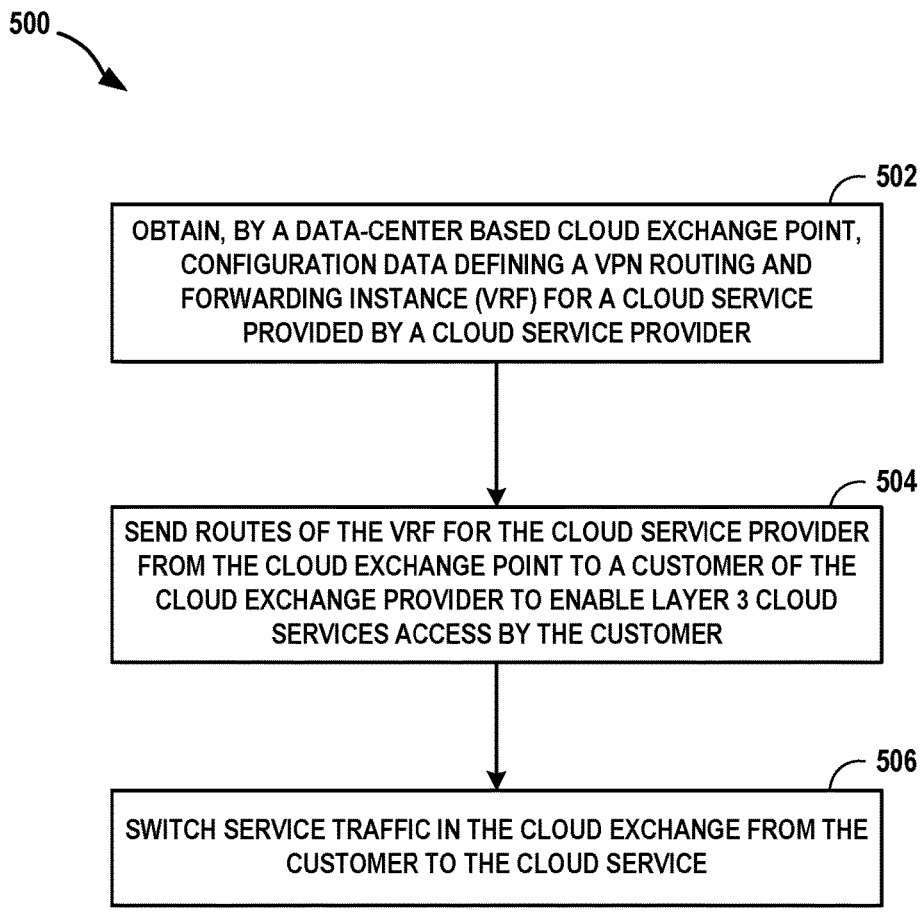
FIG. 5 is a flowchart illustrating an example mode of operation for a cloud exchange point, in accordance with techniques of this disclosure.

FIG. 5 is a flowchart illustrating an example mode of operation for a cloud exchange point, in accordance with techniques of this disclosure. Mode of operation 500 is described with respect to cloud exchange point 303 of FIGS. 3A-3B and 4, but may be performed by any example of a cloud exchange point described herein.

Cloud exchange point 303 is a data center-based cloud exchange point that includes one or more PE routers 302, 304. Cloud exchange point 303 obtains configuration data defining one or more VRFs 402A, 402B for an IP-VPN offering connectivity to a cloud service provided by a cloud service provider that employs cloud service provider network 320A (502). The configuration data may include route targets for establishing a hub-and-spoke or other topology, identifiers for the VRFs, route distinguishers for VPN routes, and other configuration data for defining VRFs. In some aspects, an interconnection platform of the cloud exchange point 303 (such as interconnection platform 203 of FIG. 2, generates and provisions the configuration data within the PE routers 302, 304 of cloud exchange point 303. PE router 302A sends routes, installed to VRFs 402A, 402B for the cloud service and providing reachability to cloud service provider network 320A, to PE router 310B of customer network 308B to enable IP endpoints of customer network 308B to access layer 3 cloud services (504). In some aspects, PE router 302B dynamically obtains the routes via a routing protocol peering session with PE router 312A of cloud service provider network 320A, and PE router 302B advertises such routes to PE 302A for installation to VRF 402A. In some aspects, an interconnection platform for the cloud exchange point 303 provides an interface (such as a web-based or other API framework) by which the cloud service provider that manages cloud service provider network 320A may provide the routes to the interconnection platform, which installs the routes to PE 302A and/or PE 304A for eventual advertisement to PE 310B via VRF 402A. Cloud exchange point 303 subsequently switches layer 3 service traffic from customer network 308B to cloud service provider network 320A along the end-to-end IP path of virtual circuit 330A (506).

Figure 6:
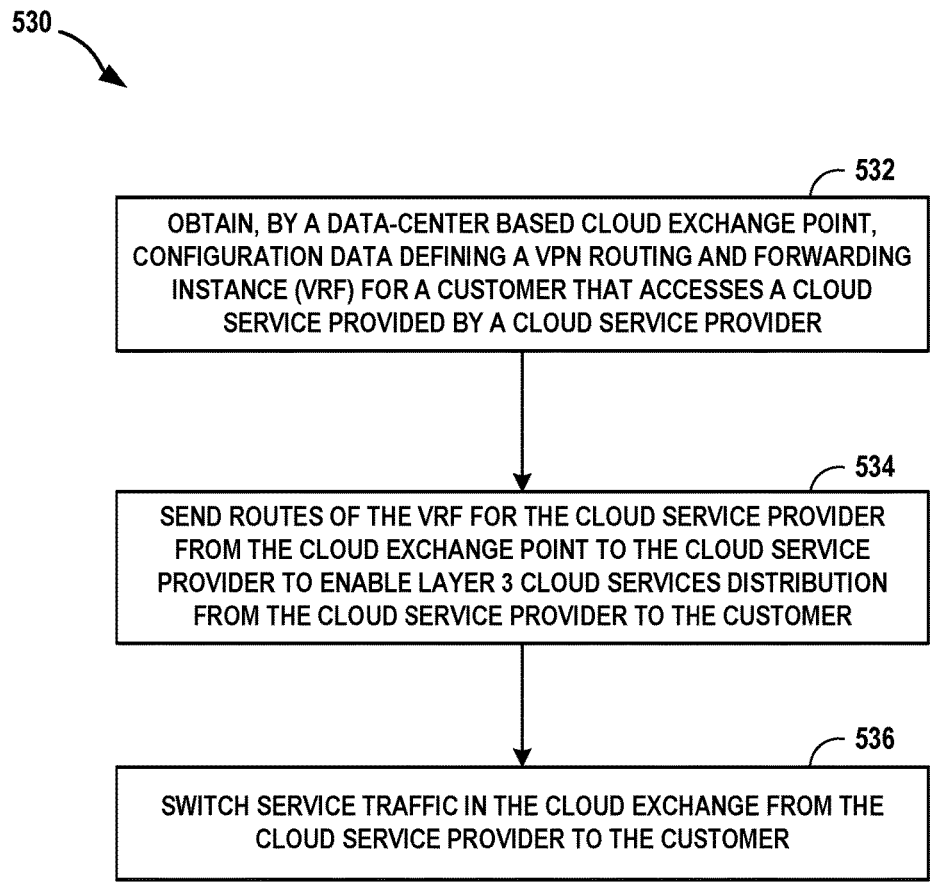
FIG. 6 is a flowchart illustrating an example mode of operation for a cloud exchange point, in accordance with techniques of this disclosure.

FIG. 6 is a flowchart illustrating an example mode of operation for a cloud exchange point, in accordance with techniques of this disclosure. Mode of operation 530 is described with respect to cloud exchange point 303 of FIGS. 3A-3B and 4, but may be performed by any example of a cloud exchange point described herein.

Cloud exchange point 303 is a data center-based cloud exchange point that includes one or more PE routers 302, 304. Cloud exchange point 303 obtains configuration data defining one or more VRFs 402A, 402B for an IP-VPN offering connectivity to a customer that employs customer network 308B (532). The configuration data may include route targets for establishing a hub-and-spoke or other topology, identifiers for the VRFs, route distinguishers for VPN routes, and other configuration data for defining VRFs. In some aspects, an interconnection platform of the cloud exchange point 303 (such as interconnection platform 203 of FIG. 2, generates and provisions the configuration data within the PE routers 302, 304 of cloud exchange point 303. PE router 304A sends routes, installed to VRFs 402A, 402B for the cloud service and providing reachability to customer network 308B, to PE router 312A of cloud service provider network 320A to enable IP endpoints of cloud service provider network 320A to distribute layer 3 cloud services to customer network 308B (534). In some aspects, PE router 302A dynamically obtains the routes via a routing protocol peering session with PE router 310B of customer network 308B, and PE router 310B advertises such routes to PE 304A for installation to VRF 402B. In some aspects, an interconnection platform for the cloud exchange point 303 provides an interface (such as a web-based or other API framework) by which the customer that manages customer network 308B may provide the routes to the interconnection platform, which installs the routes to PE 302A and/or PE 304A for eventual advertisement to PE 312A via VRF 402B. Cloud exchange point 303 subsequently switches layer 3 service traffic from cloud service provider network 320A to customer network 308B along the end-to-end IP path of virtual circuit 330A (536).

In some examples, as illustrated in FIG. 4, cloud exchange point 303 may perform a similar operation 530 with respect to provisioning routes of customer 308B in cloud service provider network 320B, using VRFs 404A, 404B. In this way, cloud exchange point 303 may aggregate cloud service traffic for multiple cloud services from multiple cloud service providers to a single customer network on the basis of VRFs using virtual circuits 330A, 330B.

FIG. 7 is a block diagram illustrating an example router configured to apply techniques described in this disclosure. Provider edge (PE) router 600 may represent any of PE routers 302, 304, for example. Moreover, while described with respect to a particular network device, e.g., a router, the techniques may be implemented by any network device that may operate to perform the functionality herein described. Components of PE router 600 apply IP/MPLS fabric endpoint operations to facilitate cloud exchange point operations in accordance with techniques of this disclosure. PE router 600 may apply any subset of the techniques. Moreover, the components are illustrative, for PE router 600 may apply the techniques using any suitable component configuration.

PE router 600 includes a control unit 602 and interface cards 620A-620B ("IFCs 620") coupled to control unit 602 via internal links 622A-622B. Control unit 602 may include one or more processors (not shown in FIG. 7) that execute software instructions, such as those used to define a software or computer program, stored to a computer-readable storage medium (again, not shown in FIG. 7), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 102 may comprise dedicated hardware, such as one or more integrated circuits, one or more Application Specific Integrated Circuits (ASICs), one or more Application Specific Special Processors (AS SPs), one or more Field Programmable Gate Arrays (FPGAs), or any combination of one or more of the foregoing examples of dedicated hardware, for performing the techniques described herein.

In this example, control unit 602 is divided into two logical or physical "planes" to include a first control or routing plane 604A and a second data or forwarding plane 604B. That is, control unit 602 implements two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 604A of control unit 602 executes the routing and signaling functionality of PE router 600. In this respect, control plane 604A represents hardware or a combination of hardware and software of control unit 602 for executing routing protocol (RP) module 606 that implements routing protocols such as MP-BGP 610 by which routing information may be received, advertised, processed, and stored in routing information base 612. RIB 612 includes information defining topologies of one or more VPNs that is associated with route targets corresponding to a VRF. That is, the VRF defines participation by PE router 600 in one or more VPNs established for a cloud exchange point in which PE router 600 operates. Control plane 604A may resolve the topology defined by routing information in RIB 612 to select or determine one or more routes through the various VPNs. PE router 600 may be configured as a hub router or a spoke router for various VPNs, in various instances. Control plane 604A may then update data plane 604B with these routes, where data plane 604B maintains these routes within forwarding information 616. Control plane 604A may also define a default routing and forwarding instance and multiple VRF instances for routing and forwarding in multiple VPNs.

Data plane 604B represents hardware or a combination of hardware and software of control unit 602 that provides high-speed forwarding of network traffic received by interface cards 620 in accordance with forwarding information 616. Forwarding component 617 of data plane 604B performs lookups in forwarding information 616 based on packet key information for received packets to determine ingress and egress interfaces and corresponding encapsulations for the packets. Forwarding component 617 may include a packet forwarding engine.

In the illustrated example, forwarding component 617 acknowledges route updates from RP module 106 after installing the route updates. For example, RP module 606 issues route update 624 directing forwarding component 617 to program a route within forwarding information 616. After forwarding component 617 programs the route, forwarding component 617 returns route update acknowledgement 626.

Management interface 608 is a process executing on control plane 604B that provides an interface by which an administrator or interconnection platform for a cloud exchange point, for instance, may modify configuration data 614 (illustrated as "config. 614") of PE router 600. Control unit 602 stores configuration data 100 to a computer-readable storage medium. Management interface 608 may present interfaces by which an administrator or other management entity (such as interconnection platform 203 of FIG. 2) may modify the configuration of PE router 600 using text-based commands, graphical interactions, a web-based portal, an Application Programming Interface (API), or another interface. In addition, or in the alternative, management interface 608 may present an agent that receives Simple Network Management Protocol (SNMP) or Netconf commands or RESTful API directives from a management entity, such as interconnection platform 203, to set and retrieve configuration and management information for PE router 600. In this way, PE router 600 may be controlled in an automated manner to provide route leaking among PE routers of a cloud exchange point to intelligently interconnect multiple cloud service provider networks to customers for the delivery of layer 3 services.

In the illustrated example, the administrative entity invoking management interface 608 accesses layer 3 routes configured for customers in customer profiles 670 and/or cloud service providers in cloud service provider (CSP) profiles 672. Customer profiles 670 include one or more customer profiles for different customers of the cloud exchange point provider. A customer profile 670 may specify reachability information for associated customer networks of the customer and information for configuring one or more attachment circuits for a physical connection to the cloud exchange point. For example, a customer profile 670 for a customer may specify one or more layer 3 routes each specifying a CE router or ASBR/PE of an associated customer network as a next hop and also specifying a destination subnet for the customer network. Management interface 608 may inject newly-obtained reachability information for customer networks along with a route target into MP-BGP 660 such that RP module 606 advertises the reachability information in association with the route target to other PE routers of the cloud exchange point, so as to provide layer 3 reachability to the customer networks. Management interface 608 may also associate attachment circuit information for a customer profile with a VRF for a VPN for the customer.

CSP profiles 672 include one or more cloud service provider profiles for different CSP customers of the cloud exchange point provider. A CSP profile 672 may specify reachability information for associated cloud service provider networks of the customer and information for configuring one or more attachment circuits for a physical connection to the cloud exchange point. For example, a CSP profile 672 for a CSP may specify one or more layer 3 routes each specifying a CE router or ASBR/PE of an associated CSP network as a next hop and also specifying a destination subnet for the CSP network. Management interface 608 may inject newly-obtained reachability information for CSP networks along with a route target into MP-BGP 660 such that RP module 606 advertises the reachability information in association with the route target to other PE routers of the cloud exchange point, so as to provide layer 3 reachability to the CSP networks. Management interface 608 may also associate attachment circuit information for a CSP profile 672 with a VRF for a VPN for the CSP.

Example details of a Layer 2/Ethernet exchange can be found in U.S. Pat. No. 8,537,845 entitled "REAL TIME CONFIGURATION AND PROVISIONING FOR A CARRIER ETHERNET EXCHANGE", filed Sep. 13, 2012; U.S. Utility application titled "REAL TIME CONFIGURATION AND PROVISIONING FOR A CARRIER ETHERNET EXCHANGE" filed on Sep. 2, 2010 having application Ser. No. 12/875,054, which claims the benefit of and priority to all three: 1) U.S. Provisional Application titled "ETHERNET EXCHANGE" filed on Dec. 10, 2009 having application Ser. No. 61/285,371 and is incorporated herein by reference in its entirety; 2) U.S. Provisional Application titled "PRIVATE NETWORK CONNECTIVITY PLATFORM" filed on Sep. 4, 2009 having application Ser. No. 61/239,997; and 3) U.S. Provisional Application titled "ETHERNET EXCHANGE" filed on Apr. 12, 2010 having application Ser. No. 61/323,066. Each of the above patents and patent applications are incorporated herein by reference in their respective entireties.

Figure 8A:
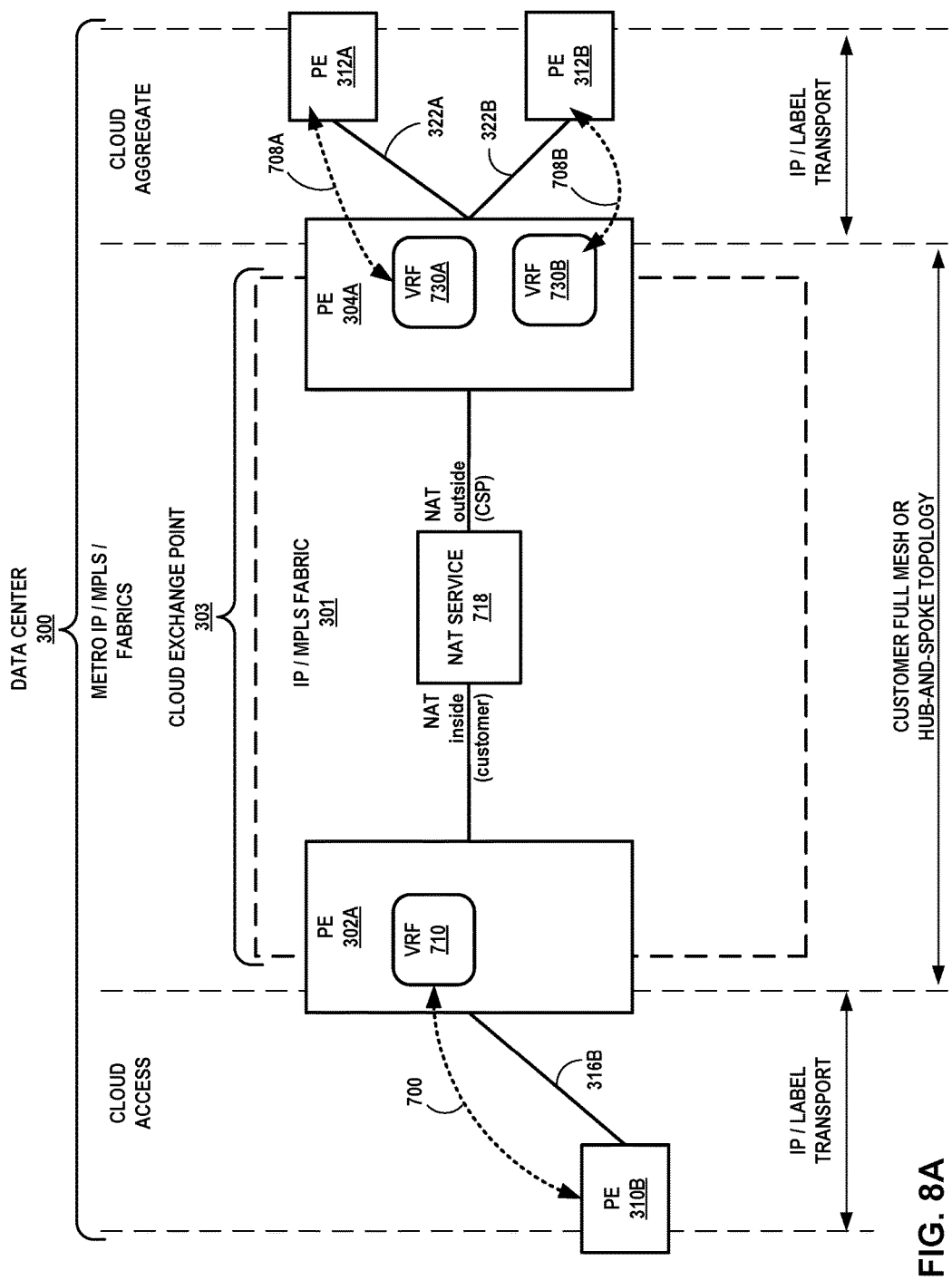
FIGS. 8A-8B are block diagrams each illustrating an example of a data center-based cloud exchange point in which a cloud exchange point is configured to apply network address translation and to route and forward aggregated service traffic from multiple cloud service provider networks to a customer network, according to techniques described herein.
Figure 8B:
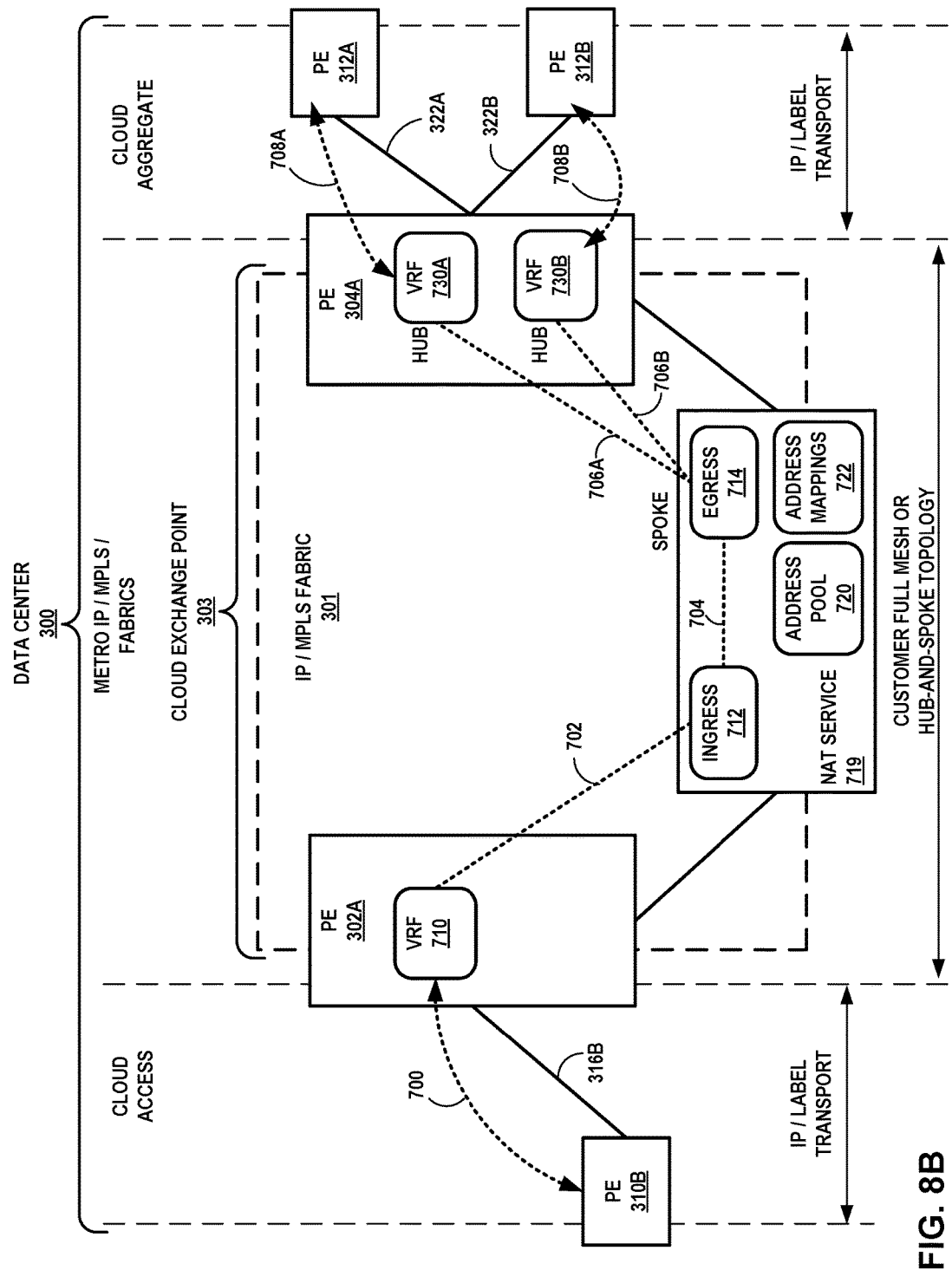

FIGS. 8A-8B are a block diagram each illustrating an example of a data center-based cloud exchange point in which a cloud exchange point is configured to apply network address translation and to route and forward aggregated service traffic from multiple cloud service provider networks to a customer network, according to techniques described herein. Cloud service provider networks 320 and customer networks 308 are not shown in FIGS. 8A-8B for ease of illustration purposes. In these examples, the data center-based cloud exchange point 303 applies a network address translation (NAT) service 718 to, in part, enforce network address separation between the cloud service layer accessible via cloud aggregation links 322 and the cloud access layer accessible via cloud access links 316.

A cloud exchange point 303 NAT device(s) that applies NAT service 718 performs NAT (or NAPT), which may also or alternatively include carrier-grade NAT ("CG-NAT" or "CGN"), to translate the cloud exchange point 303 addresses and CSP routes and/or to translate the cloud exchange point 303 addresses and customer routes. The cloud exchange point 303 NAT device(s) that applies NAT service 718 (also referred to herein as "NAT service 718 device") may include one or more dedicated NAT appliances, one or more virtual machines executing on real server(s) and configured to apply NAT using network function virtualization (NFV), one or more service cards configured to apply the NAT service 718 and inserted in one or more of PEs 302, 304, or other device(s) inbox or out-of-box.

FIG. 8A illustrates a NAT service 718 device that applies NAT to L3 cloud service traffic, traversing the cloud exchange point 303 between cloud service provider networks 320 and customer networks 308, to translate between customer L3 addresses routable on the "NAT inside" side of NAT service 718 device and CSP L3 addresses routable on the "NAT outside" side of the NAT service 718 device.

FIG. 8B illustrates a more detailed example of a NAT service 719 device showing an example implementation of the NAT service 718 of FIG. 8A. Like NAT service 718 of FIG. 8A, the NAT service 719 of FIG. 8B may be implemented in one or more NAT service devices. In FIG. 8B, the NAT service 719 is associated with an address pool 720 that is configured with routes for the cloud exchange point 303 autonomous system and from which the NAT service 719 may draw to automatically provision and map, for NAT purposes, to customer and/or cloud service provider routes received via peering sessions 700 and 708A-708B, respectively. The network addresses for configured routes in address pool 720 (or "NAT pool 720") may be public, private, or a combination thereof, and may represent IPv4 and/or IPv6 routes. In some examples, the network addresses are public in order to provide global uniqueness for the network addresses.

Address mappings 722 may specify one or more NAT mappings and/or network address and port translations (NAPT) that associate routes from address pool 720 for the cloud exchange point 303 with routes received by the cloud exchange point 303 routers from any of PEs 310, 312. Routes received from any of PEs 310, 312 for translation and used in end-to-end service delivery may include any IP addresses/prefixes from enterprise/NSP customers of the cloud exchange provider, such addresses including private and/or public IPv4 and/or IPv6 addresses and received at any one or more of the cloud exchange points managed by the cloud exchange provider.

As noted above, NAT service 719 may perform NAT to translate customer routes for customer network 308B (not shown in FIGS. 8A-8B) and cloud exchange point 303 routes advertised to PEs 312A, 312B for aggregated cloud access. As a result, CSP networks 320 (not shown in FIGS. 8A-8B) receive the cloud exchange point 303 routes drawn from address pool 720 instead of the customer routes. The cloud exchange point 303 is thus able to filter customer network information from the CSPs, and the CSPs receive cloud exchange point 303 routes associated with a single autonomous system (i.e., the cloud exchange point 303 and one ASN per cloud exchange point) rather than customer routes (which could potentially number in the millions) associated with multiple different autonomous systems (and corresponding ASNs, which could potentially number in the hundreds) for various customers (enterprises and/or NSPs). Further, because the cloud exchange point 303 does not advertise its routes other than to customers and CSPs, the cloud exchange point 303 does not announce its routes to the Internet, which may improve security and reduce the potential for DoS or other malicious activity directed to the cloud exchange point 303 and customers/CSPs with which the cloud exchange point 303 has peering relationships. In addition, the techniques described above may simplify end-to-end cloud service delivery processing and improve performance by ensuring that local traffic is processed locally (within the cloud exchange point 303).

In the illustrated example, NAT service 719 is associated with ingress service VRF 712 ("ingress 712") and egress service VRF 714 ("egress 714") for attracting service traffic that is associated with customer network 308B and that is to be NATted. Ingress 712 and egress 714 constitute part of a customer service chain for cloud service traffic between customer network 308B and CSP networks 320A, 320B. Customer VRF 710 associated customer network 308B receives routes from customer PE 310B via peering session 700. Customer VRF 710 may be configured in a VPN-full mesh relationship with ingress service VRFs distributed in the cloud exchange point 303 (only one peering session 702 is illustrated, however).

In some examples, PE 302A distributes, for VRF 710, customer routes received via peering session 700 to the NAT service 719, which dynamically maps the customer route prefixes to cloud exchange point route prefixes drawn from address pool 720. The customer routes are installed to ingress service VRF 712. The NAT service 719 installs the mappings to address mappings 722 and also installs, to egress service VRF 714, cloud exchange point routes that specify the cloud exchange point route prefixes and NAT service 719 as the next hop. In this way, NAT service 719 and more specifically egress service VRF 714 attracts downstream traffic from CSP network 320 that is intended for the customer network 308B but destined for the cloud exchange point routes installed to egress service VRF 714. Ingress service VRF 712 and egress service VRF 714 may establish peering session 704 and be configured with route targets so as to cause VRFs 712, 714 to leak routes to one another via iBGP, for instance.

Egress service VRF 714 may operate as a spoke VRF for corresponding hub VRFRs 730A, 730B in a manner similar to VRFs of PE 302A operating as spoke VRFs in the example of FIG. 4. That is, egress service VRF 714 and VRFs 730A, 730B are configured with reciprocal route targets such that egress service VRF 714 advertises routes for the egress service VRF 714 for installation to VRFs 730A, 730B, while VRFs 730A, 730B advertise routes for corresponding CSP networks 320A, 320B to egress service VRF 714. NATted upstream service traffic destined to any of CSP networks 320A, 320B passes through corresponding hub VRFs 730A, 730B. Each of peering sessions 706A, 706B may be used in this way to create hub-and-spoke VPNs for the respective CSP networks 320A, 320B.

PEs 302, 304 may establish tunnels with the NAT service 719 device. Routes exchanged via peering sessions 702 and 706A, 706B may include labeled routes for implementing MPLS/BGP IP-VPNs according to RFC 4364, incorporated above.

Cloud exchange point 303 may forward and apply NAT service 719 to downstream service traffic from PE 312A, intended for customer network 308A, as follows. PE 304A receives a service packet on aggregation link 322A. The packet has a destination address that is a cloud exchange point 303 address drawn from address pool 720. VRF 730A associated with aggregation link 322A stores a route for the destination address that specifies an address for the NAT service 719 device, and PE 304A tunnels the packet using VRF 730A to the NAT service 719 device for application of the NAT service. NAT service 719 uses address mappings 722 dynamically provisioned for routes for customer network 308A and received from PE 302A to perform NAT and replace the service packet destination address with a destination address in customer network 308A. The NAT service 719 device may determine in ingress service VRF 712 the labeled route to PE 302A (the label identifying VRF 710) and tunnel the modified service packet PE 302A, which may identify VRF 710 from the label attached to the modified service packet. PE 302A forwards the modified service packet to PE 310 via access link 316B. In this way, cloud exchange point 303 provides a NAT service to the customer to separate the customer from the cloud service layer. In a similar way, the cloud exchange point 303 may apply NAT to upstream traffic so as to separate cloud service providers from the cloud or network access layer by which customer networks access the cloud exchange point.

Figure 9:
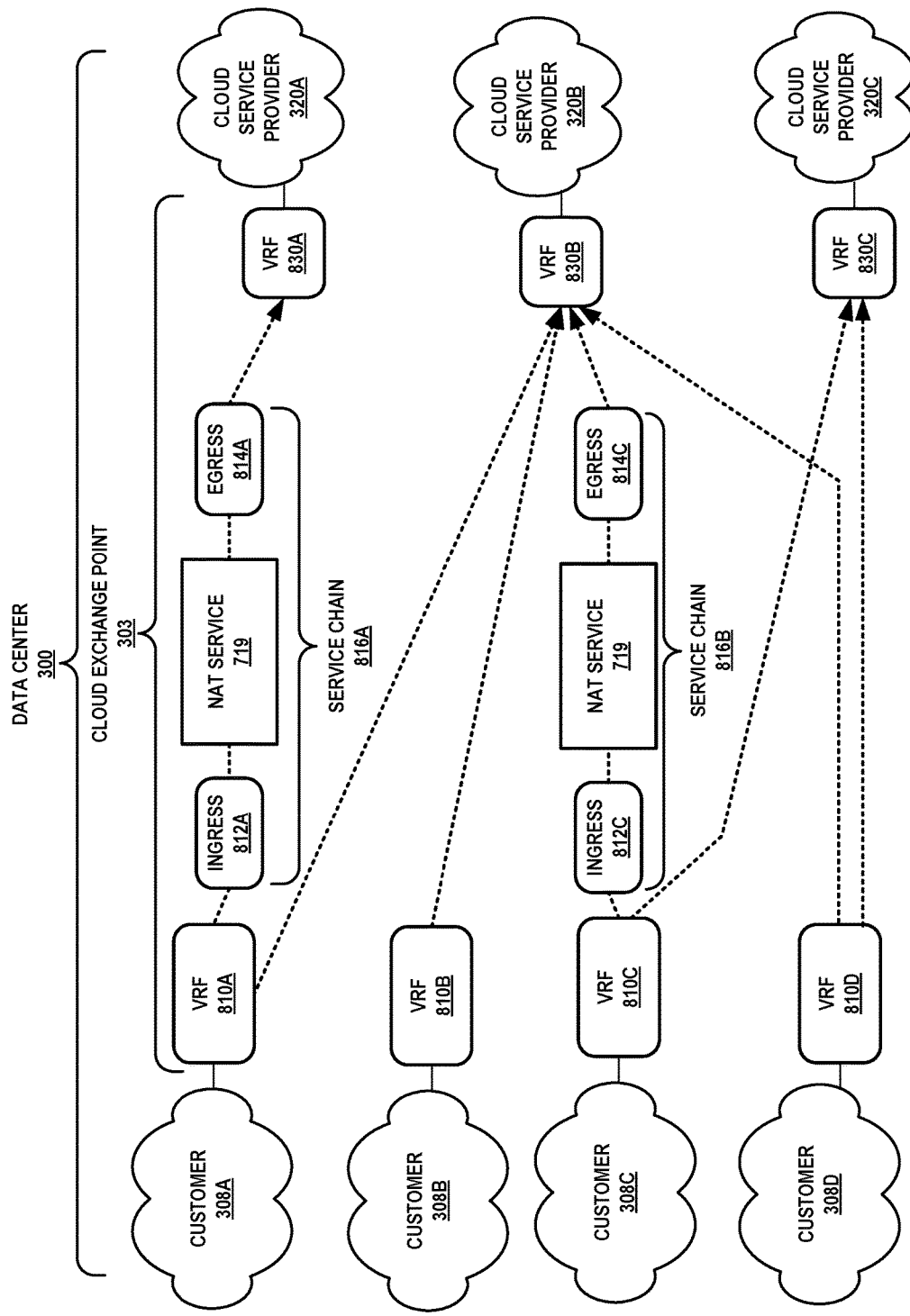
FIG. 9 is a block diagram illustrating flexible subscription by customer networks to cloud services, in accordance with techniques described in this disclosure.

FIG. 9 is a block diagram illustrating flexible subscription by customer networks to cloud services, in accordance with techniques described in this disclosure. In this example cloud exchange point 303 is configured with customer VRFs 810, ingress VRFs 812, egress VRFs 814, and CSP VRFs 830 to cause PE routers of cloud exchange point 303 to advertise routes that facilitate customer service chaining and delivery of cloud service traffic. FIG. 9 illustrates a flexible subscription, in which any customer network 308 is able to "subscribe" to any CSP network 320 to receive cloud service traffic and, moreover, any customer network 308 is able to receive a NAT or other network function virtualization (NFV) service provided by the cloud exchange point 303 according to VRF-based service chains.

PE routers of cloud exchange point 303 (not shown in FIG. 9) coupled to customer networks 308, 320, are configured with VRFs 810, 830 while service (e.g., "network function virtualization") nodes such as NAT service device 719 are configured with ingress VRFs 812, egress VRFs 814. For instance, customer network 308A is "subscribed to," e.g. receives routes from and has L3 reachability to, CSP networks 320A, 320B. The end-to-end L3 path between customer network 308A and CSP network 320A includes a VRF-implemented service chain 816A to cause L3 cloud service traffic between customer network 308A and CSP network 320A to traverse NAT service 719 for application of NAT to the L3 cloud service traffic, as described above with respect to FIG. 8B. However, the end-to-end L3 path between customer network 308A and CSP network 320B does not include a service chain. The customer VRF 810B instead imports routes marked with an "up" RT directly exported by CSP VRF 830B, and CSP VRF 830B imports routes marked with a "down" RT exported by customer VRF 810B. Customer networks 308B, 308C, and 308D are also subscribed to CSP network 320B to exchange L3 cloud service traffic with CSP network 320B. Thus, enterprise customers can subscribe to different CSPs with or without NAT services. The NAT service implements the service chain by including ingress or "left" VRFs 812 and egress or "right" VRFs 814.

Each of VRFs 810 may represent an example instance of VRF 710 of FIGS. 8A-8B. Each of ingress VRFs 812 may represent an example instance of any of VRFs 712 of FIGS. 8A-8B. Each of egress VRFs 814 may represent an example instance of any of VRFs 714 of FIGS. 8A-8B. Each of ingress VRFs 830 may represent an example instance of VRF 730 of FIGS. 8A-8B.

According to the multi-CSP network subscription model as depicted in FIG. 9, CSP VRFs 830, configured as hubs for one or more spoke VRFs, export routes marked with an "up" RT, which are imported by the spoke customer VRFs 810 in the absence of a service chain. The spoke customer VRFs 810 export routes marked with a "down" RT, which are imported by the CSP VRFs 830 in the absence of a service chain.

For the end-to-end L3 path between customer network 308A and CSP network 320A including service chain 816A, CSP routes imported by egress VRF 814B from CSP VRF 830A are network address translated by NAT service 719 to customer routes, which are then exported by ingress VRF 812A for import by customer VRF 810A. In the other direction, customer routes imported by ingress VRF 812A from customer VRF 810A are network address translated by NAT service 719 to CSP routes, which are then exported by egress VRF 814B to CSP VRF 830A. In this way, customer network 308A and CSP network 320A may exchange bi-directional L3 cloud service traffic with network address translation. An iBGP session, for example, runs between ingress VRF 812A and egress VRF 814A to facilitate route advertisement.

Example configurations for VRFs that implement, at least part, the end-to-end L3 path between customer network 308A and CSP network 320A are included below.

CSP VRF 830A may be configured with the following configuration data to exchange routes with egress VRF 814A on an aggregate basis and to exchange routes with CSP network 320A:

```
RI-VRF-CSP001-001 {
    description "CSP001 Routing Instance";
    instance-type vrf;
    interface xe-0/1/6.1;
    route-distinguisher 10.8.8.2:4000;
    vrf-import [ IMPORT-RT-RI-VRF-CSP001-001
    IMPORT-TO-CSP001-001 ];
    vrf-export [ EXPORT-RT-RI-VRF-CSP001-001
    EXPORT-FROM-CSP001-001
    DEFAULT_ACCEPT ];
    routing-options {
        auto-export;
    }
    protocols {
        bgp {
            group EXTERNAL-PEER {
                type external;
                peer-as 100;
                neighbor 1.1.1.1 {
                    import IMPORT-BGP-PRIMARY;
                    family inet {
                        unicast {
                            prefix-limit {
                                maximum 500;
                            }
                        }
                    }
                    authentication-key "abcdefgh "; ## SECRET-DATA
                }
            }
        }
    }
}
```

The IMPORT-TO-CSP001-001 is a "down" RT while EXPORT-FROM-CSP001-001 is an "up" RT. CSP VRF 830A may be configured with the following configuration data to exchange routes with egress VRF 814A on an customer-specific basis and to exchange routes with CSP network 320A:

```
RI-VRF-CSP003-001 {
    description "CSP003 Routing Instance";
    instance-type vrf;
    interface xe-0/1/6.1;?
    route-distinguisher 10.8.8.1:3000;
    vrf-import [ IMPORT-RT-RI-VRF-CSP003-001 ];
    vrf-export [ EXPORT-RT-RI-VRF-CSP003-001
    DEFAULT_ACCEPT ];
    routing-options {
        auto-export;
    }
    protocols {
        bgp {
            group EXTERNAL-PEER {
                type external;
                peer-as 100;
                neighbor 1.1.1.1 {
                    import IMPORT-BGP-PRIMARY;
                    family inet {
                        unicast {
                            prefix-limit {
                                maximum 500;
                            }
                        }
                    }
                    authentication-key "abcdefg"; ## SECRET-DATA
                }
            }
        }
    }
}
```

Customer VRF 810A may be configured with the following configuration data to exchange routes with ingress VRF 812A on an customer-specific basis and to exchange routes with customer network 308A:

```
RI-VRF-CUST0001-001 {
    description "CUST0001 Routing Instance";
    instance-type vrf;
    interface xe-0/1/4.1;
    route-distinguisher 10.8.8.2:3000;
    vrf-import [ IMPORT-RT-RI-VRF-CUST0001-001];
    vrf-export [ EXPORT-RT-RI-VRF-CUST0001-001
    DEFAULT_ACCEPT];
    routing-options {
        auto-export;
    }
    protocols {
        bgp {
            group EXTERNAL-PEER {
                type external;
                peer-as 200;
                neighbor 1.1.1.1 {
                    import IMPORT-BGP-PRIMARY;
                    family inet {
                        unicast {
                            prefix-limit {
                                maximum 500;
                            }
                        }
                    }
                    authentication-key "abcdefg"; ## SECRET-DATA
                }
            }
        }
    }
}
```

Ingress VRF 812A may be configured with the following configuration data to exchange routes with customer VRF 810A and with egress VRF 814A via iBGP as follows:

```
routing-instances {
    RI-LVRF-CUST0001-001 {
        description "RT-RI-VRF-CUST0001-001 Left Service VRF 001";
        instance-type vrf;
        interface lt-0/0/10.2;
        interface ams0.2;
        route-distinguisher 10.8.8.2:3000;
        vrf-target target:65005:10000;
        routing-options {
            static {
                route 1.4.1.1/32 next-hop ams0.2;
            }
            auto-export;
        }
    protocols {
```

```
bgp {
    group INTERNAL {
        type internal;
        neighbor 1.3.1.1 {
            hold-time 30;
            import IMPORT-RI-LVRF-CUST0001-001-BGP;
            export DENYALL;
        }
    }
}
}
policy-statement IMPORT-RI-LVRF-CUST0001-001-BGP {
    then {
        community delete ALL-RT;
        next-hop 1.4.1.1;
        accept;
    }
}
```

The policy-statement configuration data sets a next-hop for the ingress VRF 812A to the NAT service 719. Egress VRF 814A may be configured with the following configuration data to exchange routes with CSP VRF 830A and with ingress VRF 812A via iBGP as follows:

```
RI-RVRF-CUST0001-001 {
    description "RI-RVRF-CUST0001-001
    Right Service VRF #001";
    instance-type vrf;
    interface lt-0/0/10.3;
    interface ams0.3;
    route-distinguisher 10.8.8.2:3000;
    vrf-import [ ];
    vrf-export [ DEFAULT_ACCEPT ];
    routing-options {
        auto-export;
    }
    protocols {
        bgp {
            group INTERNAL {
                type internal;
                neighbor 1.3.1.0 {
                    hold-time 30;
                    import DENYALL;
                }
            }
        }
    }
}
```

NAT service device 719 may be configured with the following configuration data to allow the iBGP session to bypass the NAT engine:

```
interfaces {
    lt-0/0/10 {
        unit 2 {
            encapsulation ethernet;
            peer-unit 3;
            family inet {
                address 1.3.1.0/31;
            }
        }
        unit 3 {
            encapsulation ethernet;
            peer-unit 2;
            family inet {
                address 1.3.1.1/31;
                address 1.4.1.1/31;
            }
        }
    }
    ams0 {
```

```
        load-balancing-options {
            member-interface mams-11/0/0;
            ...
        }
        services-options {
            inactivity-non-tcp-timeout 10;
        }
        unit 2 {
            family inet;
            service-domain inside;
        }
        unit 3 {
            family inet;
            service-domain outside;
        }
```

The AMS configuration data for AMS interfaces may map traffic to multiple multi-service cards. The forward NAT service set for NAT service device 719 may be configured using the following configuration data:

```
service-set SERVICE-CUST0001-001 {
    nat-rules RULE-CUST0001-001;
    next-hop-service {
        inside-service-interface ams0.2;
        outside-service-interface ams0.3;
    }
}
nat {
    pool POOL-CUST0001-001 {
        address 90.90.1.1/32;
        port {
            automatic;
        }
        snmp-trap-thresholds {
            address-port low 25 high 75;
        }
    }
    rule RULE-CUST0001-001 {
        match-direction input;
        term term1 {
            then {
                translated {
                    source-pool POOL-CUST0001-001;
                    translation-type {
                        napt-44;
                    }
                }
            }
        }
    }
}
```

The pool POOL-CUST0001-001 may represent an example instance of address pool 720. The reverse NAT service set for NAT service device 719 may be configured using the following configuration data:

```
service-set SERVICE-CUST0001-002 {
    nat-rules RULE-CUST0001-002;
    next-hop-service {
        inside-service-interface ams0.4;
        outside-service-interface ams0.5;
    }
}
nat {
    pool POOL-CUST0001-002 {
        address 90.90.1.1/32;
        apply-groups CUST-NAT-POOL-TEMPLATE;
    }
    rule RULE-CUST0001-002 {
        match-direction input;
        term term1 {
```

```
            from {
                destination-address {
                    201.201.1.1/32;
                }
            }
        }
        then {
            translated {
                source-pool POOL-CUST0001-001;
                translation-type {
                    napt-44;
                }
            }
        }
    }
}
```

The destination-address 200.200.1.1/32 may represent an AD or public server IP/subnet.

Customers may also subscribe to CSP networks without a NAT service chain. An example configuration for customer VRF 810D for customer network 308D, to exchange routes with CSP VRFs 830B, 830C for respective CSPs 320B, 320C is as follows:

```
RI-VRF-CUST0001-001 {
    description "CUST0001 Routing Instance";
    instance-type vrf;
    interface xe-0/1/4.1;
    route-distinguisher 10.8.8.2:3000;
    vrf-import [ IMPORT-RT-RI-VRF-CUST0001-001
    IMPORT-FROM-CSP002-
    001 IMPORT-FROM-CSP003-001];
    vrf-export [ EXPORT-RT-RI-VRF-CUST0001-001
    EXPORT-TO-CSP002-001
    EXPORT-TO-CSP003-001 DEFAULT_ACCEPT ];
    routing-options {
        auto-export;
    }
}
```

In the above example, IMPORT-FROM-CSP001-001 and IMPORT-FROM-CSP002-001 represent "up" RTs, while EXPORT-TO-CSP001-001 EXPORT-TO-CSP002-001 represent "down" RTs. To subscribe to CSP networks 320A with NAT using service chain 816A, an example configuration of egress VRF 814A is as follows:

```
RI-RVRF-CUST0001-001 {
    description "RI-RVRF-CUST0001-001
    Right Service VRF #001";
    instance-type vrf;
    interface lt-0/0/10.3;
    interface ams0.3;
    route-distinguisher 10.8.8.2:6002;
    vrf-import [ IMPORT-FROM-CSP001-001 ];
    vrf-export [ EXPORT-TO-CSP001-001
    DEFAULT_ACCEPT ];
```

In the above example, IMPORT-FROM-CSP001-001 represents an "up" RT, while EXPORT-TO-CSP001-001 represents a "down" RT.

For L2 cloud service traffic, any of PEs 302, 304 may be configured to operate as a virtual switch. Example configuration data for a virtual switch configuration is as follows:
  set routing-instances RI-VS-1 instance-type virtual-switch
  set routing-instances RI-VS-1 route-distinguisher xxxxxxxxxxxxxxx
  set routing-instances RI-VS-1 vrf-target target: xxxxxxxxxxxxxxxxxxxxxx
  set routing-instances RI-VS-1 protocols evpn extended-vlan-list 100
  set routing-instances RI-VS-1 bridge-domains BD-2130 domain-type bridge
  set routing-instances RI-VS-1 bridge-domains BD-2130 vlan-id 100
  set routing-instances RI-VS-1 bridge-domains BD-2130 interface xe-1/2/6.1 -------------------- Access enterprise site
  set routing-instances RI-VS-1 bridge-domains BD-2130 interface ae2.45 ------------- CSP site
  set routing-instances RI-VS-1 bridge-domains BD-2130 bridge-options mac-table-size 2048
  set routing-instances RI-VS-1 bridge-domains BD-2130 bridge-options mac-table-size packet-action drop
  set routing-instances RI-VS-1 bridge-domains BD-2130 bridge-options interface-mac-limit 2048
  set routing-instances RI-VS-1 bridge-domains BD-2130 bridge-options interface-mac-limit packet-action drop The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A cloud-based services exchange point comprising:
a layer three (L3) autonomous system located within a data center,
wherein the L3 autonomous system is configured to receive, from each of a plurality of cloud service provider networks, cloud service traffic for at least one cloud service and for distribution to one or more customer networks;
a plurality of attachment circuits configured to connect, within the data center, the respective plurality of cloud service provider networks to the L3 autonomous system; and
one or more attachment circuits configured to connect, within the data center, the respective one or more customer networks to the L3 autonomous system,
wherein the L3 autonomous system is configured to interconnect the plurality of cloud service provider networks and the one or more customer networks by establishing end-to-end L3 paths between the plurality of cloud service provider networks and the one or more customer networks, each end-to-end L3 path including one of the plurality of attachment circuits connecting the respective plurality of cloud service provider networks to the L3 autonomous system and also including one of the one or more attachment circuits connecting the respective one or more customer networks to the L3 autonomous system,
wherein the L3 autonomous system is configured to forward cloud service traffic, received on the plurality of attachment circuits connecting the respective plurality of cloud service provider networks along the end-to-end L3 paths, to the one or more attachment circuits connecting the respective one or more customer networks to the L3 autonomous system.

2. The cloud-based services exchange point of claim 1, wherein the L3 autonomous system is configured with an autonomous system number that identifies the L3 autonomous system within an autonomous system path to a routing protocol.

3. The cloud-based services exchange point of claim 1,
wherein the L3 autonomous system is configured to aggregate, to form aggregated cloud service traffic, first cloud service traffic originating from a first cloud service provider network of the plurality of cloud service provider networks and second cloud service traffic originating from a second cloud service provider network of the plurality of cloud service provider networks, and
wherein the L3 autonomous system is configured to deliver the aggregated cloud service traffic to a customer network of the one or more customer networks.

4. The cloud-based services exchange point of claim 1,
wherein the L3 autonomous system is configured to aggregate, to form aggregated cloud service traffic, first cloud service traffic originating from a first customer network of the one or more customer networks and second cloud service traffic originating from a second customer network of the one or more customer networks, and
wherein the L3 autonomous system is configured to deliver the aggregated cloud service traffic to a cloud service provider network of the plurality of cloud service provider networks.

5. The cloud-based services exchange point of claim 1, wherein each of the one or more customer networks comprises one of a network service provider network and an enterprise network.

6. The cloud-based services change point of claim 1,
wherein the L3 autonomous system comprises an Internet Protocol network interconnecting a plurality of provider edge (PE) routers by a plurality of tunnels, and
wherein each of the end-to-end L3 paths comprises one of the plurality of tunnels.

7. The cloud-based services exchange point of claim 6,
wherein the IP network comprises an IP/Multiprotocol label switching (IP/MPLS) fabric, and
wherein the plurality of PE routers are configured to obtain configuration data defining one or more virtual private network routing and forwarding instances (VRFs) for a cloud service of the at least one cloud service and provided by a cloud service provider network of the plurality of cloud service providers network.

8. The cloud-based services exchange point of claim 6,
wherein the IP network comprises an IP/Multiprotocol label switching (IP/MPLS) fabric,
wherein, to establish the end-to-end L3 paths, a first PE router of the plurality of PE routers is configured to export a L3 route specifying a route to a cloud service of the at least one cloud service, the first PE router coupled to an attachment circuit of the plurality of attachment circuits that is also coupled to the cloud service provider network,
wherein, to establish the end-to-end L3 paths, a second PE router of the plurality of PE routers is configured to import the L3 route specifying the route to the cloud service, the second PE router coupled to an attachment circuit of the one or more attachment circuits that is also coupled to a customer network of the one or more customer networks, and
wherein the first PE router is configured to forward cloud service traffic for the cloud service to the second PE router according to the L3 route.

9. The cloud-based services exchange point of claim 8, wherein the first PE router is a hub router and the second PE router is a spoke router for a hub-and-spoke virtual private network for the cloud service.

10. The cloud-based services exchange point of claim 6,
wherein the IP network comprises an IP/Multiprotocol label switching (IP/MPLS) fabric,
wherein, to establish the end-to-end L3 paths, a first PE router of the plurality of PE routers is configured to export a L3 route specifying a route to a customer network of the plurality of customer networks, the first PE router coupled to an attachment circuit of the one or more attachment circuits that is also coupled to the customer network,
wherein, to establish the end-to-end L3 paths, a second PE router of the plurality of PE routers is configured to import the L3 route specifying the route to the customer network, the second PE router coupled to an attachment circuit of the plurality of attachment circuits that is also coupled to the cloud service provider, and
wherein the first PE router is configured to forward cloud service traffic for the cloud service to the second PE router according to the L3 route.

11. The cloud-based services exchange point of claim 10, wherein the first PE router is a spoke router and the second PE router is a hub router for a hub-and-spoke virtual private network for the cloud service.

12. The cloud-based services exchange point of claim 1, wherein the one or more customer networks receive L3 routes for the plurality of cloud service provider networks only from one of an operator of the cloud-based services exchange point and the L3 autonomous system.

13. The cloud-based services exchange point of claim 12, wherein the L3 autonomous system comprises a network address translation (NAT) service device configured to apply a NAT service to the cloud service traffic,
wherein the cloud service traffic comprises destination L3 addresses that are L3 addresses advertised by the cloud exchange point to the plurality of cloud service provider networks,
wherein to apply the NAT service to the cloud service traffic the NAT service device is configured to modify the destination L3 addresses of the cloud service traffic to generate modified cloud service traffic that comprises destination L3 addresses that are L3 addresses advertised by the one or more customer networks to the L3 autonomous system, and
wherein to forward the cloud service traffic to the one or more attachment circuits connecting the respective one or more customer networks to the L3 autonomous system, the L3 autonomous system is configured to forward, based on the destination L3 address of the modified cloud service traffic, the modified cloud service traffic to the one or more attachment circuits connecting the respective one or more customer networks to the L3 autonomous system.

14. The cloud-based services exchange point of claim 13, wherein the NAT service device is configured with an address pool that includes the L3 addresses advertised by the cloud exchange point to the plurality of cloud service provider networks, and
wherein the NAT service device is configured to automatically map, in response to receiving the L3 addresses advertised by the one or more customer networks, the L3 addresses advertised by the one or more customer networks to the L3 addresses advertised by the cloud exchange point to the plurality of cloud service provider networks.

15. A method comprising:
by a layer three (L3) autonomous system of a cloud-based services exchange point and located within a data center, receiving, from each of a plurality of cloud service provider networks, cloud service traffic for at least one cloud service and for distribution to one or more customer networks,
wherein a plurality of attachment circuits is configured to connect, within the data center, the respective plurality of cloud service provider networks to the L3 autonomous system,
wherein one or more attachment circuits are configured to connect, within the data center, the respective one or more customer networks to the L3 autonomous system;
interconnecting, by the L3 autonomous system, the plurality of cloud service provider networks and the one or more customer networks by establishing end-to-end L3 paths between the plurality of cloud service provider networks and the one or more customer networks, each end-to-end L3 path including one of the plurality of attachment circuits connecting the respective plurality of cloud service provider networks to the L3 autonomous system and also including one of the one or more attachment circuits connecting the respective one or more customer networks to the L3 autonomous system;
forwarding, by the L3 autonomous system, cloud service traffic, received on the plurality of attachment circuits connecting the respective plurality of cloud service provider networks along the end-to-end L3 paths, to the one or more attachment circuits connecting the respective one or more customer networks to the L3 autonomous system.

16. The method of claim 15, wherein the L3 autonomous system is configured with an autonomous system number that identifies the L3 autonomous system within an autonomous system path to a routing protocol.

17. The method of claim 15, further comprising:
aggregating, by the L3 autonomous system to form aggregated cloud service traffic, first cloud service traffic originating from a first cloud service provider network of the plurality of cloud service provider networks and second cloud service traffic originating from a second cloud service provider network of the plurality of cloud service provider networks; and
delivering, by the L3 autonomous system, the aggregated cloud service traffic to a customer network of the one or more customer networks.

18. The method of claim 15, further comprising:
aggregating, by the L3 autonomous system to form aggregated cloud service traffic, first cloud service traffic originating from a first customer network of the one or more customer networks and second cloud service traffic originating from a second customer network of the one or more customer networks; and
delivering, by the L3 autonomous system, the aggregated cloud service traffic to a cloud service provider network of the plurality of cloud service provider networks.

19. The method of claim 15, wherein each of the one or more customer networks comprises one of a network service provider network and an enterprise network.

20. The method of claim 15,
wherein the L3 autonomous system comprises an Internet Protocol network interconnecting a plurality of provider edge (PE) routers by a plurality of tunnels, and
wherein each of the end-to-end L3 paths comprises one of the plurality of tunnels.

21. The method of claim 20,
wherein the IP network comprises an IP/Multiprotocol label switching (IP/MPLS) fabric, and
wherein the plurality of PE routers obtain configuration data defining one or more virtual private network routing and forwarding instances (VRFs) for a cloud service of the at least one cloud service and provided by a cloud service provider network of the plurality of cloud service providers network.

22. The method of claim 20,
wherein the IP network comprises an IP/Multiprotocol label switching (IP/MPLS) fabric,
wherein, to establish the end-to-end L3 paths, a first PE router of the plurality of PE routers exports a L3 route specifying a route to a cloud service of the at least one cloud service, the first PE router coupled to an attachment circuit of the plurality of attachment circuits that is also coupled to the cloud service provider network,
wherein, to establish the end-to-end L3 paths, a second PE router of the plurality of PE routers imports the L3 route specifying the route to the cloud service, the second PE router coupled to an attachment circuit of the one or more attachment circuits that is also coupled to a customer network of the one or more customer networks, and wherein the first PE router forwards cloud service traffic for the cloud service to the second PE router according to the L3 route.

23. The method of claim 22, wherein the first PE router is a hub router and the second PE router is a spoke router for a hub-and-spoke virtual private network for the cloud service.

24. The method of claim of claim 20,
wherein the IP network comprises an IP/Multiprotocol label switching (IP/MPLS) fabric,
wherein, to establish the end-to-end L3 paths, a first PE router of the plurality of PE routers exports a L3 route specifying a route to a customer network of the plurality of customer networks, the first PE router coupled to an attachment circuit of the one or more attachment circuits that is also coupled to the customer network,
wherein, to establish the end-to-end L3 paths, a second PE router of the plurality of PE routers imports the L3 route specifying the route to the customer network, the second PE router coupled to an attachment circuit of the plurality of attachment circuits that is also coupled to the cloud service provider, and
wherein the first PE router forwards cloud service traffic for the cloud service to the second PE router according to the L3 route.

25. The method of claim 24, wherein the first PE router is a spoke router and the second PE router is a hub router for a hub-and-spoke virtual private network for the cloud service.

26. The method of claim 20, wherein the L3 autonomous system comprises a network address translation (NAT) service device that applies a NAT service to the cloud service traffic.

27. The method of claim 26,
wherein the cloud service traffic comprises destination L3 addresses that are L3 addresses advertised by the cloud exchange point to the plurality of cloud service provider networks,
wherein to apply the NAT service to the cloud service traffic the NAT service device modifies the destination L3 addresses of the cloud service traffic to generate modified cloud service traffic that comprises destination L3 addresses that are L3 addresses advertised by the one or more customer networks to the L3 autonomous system, and
wherein to forward the cloud service traffic to the one or more attachment circuits connecting the respective one or more customer networks to the L3 autonomous system, the L3 autonomous system forwards, based on the destination L3 address of the modified cloud service traffic, the modified cloud service traffic to the one or more attachment circuits connecting the respective one or more customer networks to the L3 autonomous system.

28. The method of claim 27,
wherein the NAT service device is configured with an address pool that includes the L3 addresses advertised by the cloud exchange point to the plurality of cloud service provider networks, and
wherein the NAT service device automatically maps, in response to receiving the L3 addresses advertised by the one or more customer networks, the L3 addresses advertised by the one or more customer networks to the L3 addresses advertised by the cloud exchange point to the plurality of cloud service provider networks.

29. A cloud-based services exchange point comprising:
an interconnection platform;
a layer three (L3) autonomous system located within a data center,
wherein the L3 autonomous system is configured to receive, from each of a plurality of cloud service provider networks, cloud service traffic for at least one cloud service and for distribution to one or more customer networks;
a plurality of attachment circuits configured to connect, within the data center, the respective plurality of cloud service provider networks to the L3 autonomous system; and
one or more attachment circuits configured to connect, within the data center, the respective one or more customer networks to the L3 autonomous system,
wherein the L3 autonomous system is configured by the interconnection platform to interconnect the plurality of cloud service provider networks and the one or more customer networks by establishing end-to-end L3 paths between the plurality of cloud service provider networks and the one or more customer networks, each end-to-end L3 path including one of the plurality of attachment circuits connecting the respective plurality of cloud service provider networks to the L3 autonomous system and also including one of the one or more attachment circuits connecting the respective one or more customer networks to the L3 autonomous system, and
wherein the L3 autonomous system is configured by the interconnection platform to forward cloud service traffic, received on the plurality of attachment circuits connecting the respective plurality of cloud service provider networks along the end-to-end L3 paths, to the one or more attachment circuits connecting the respective one or more customer networks to the L3 autonomous system.

* * * * *

UNITED STATES PATENT AND TRADEMARK OFFICE
CERTIFICATE OF CORRECTION

PATENT NO. : 9,712,435 B2  
APPLICATION NO. : 15/344100  
DATED : July 18, 2017  
INVENTOR(S) : Juxiang Teng and Ihab Tarazi Page 1 of 1

It is certified that error appears in the above-identified patent and that said Letters Patent is hereby corrected as shown below:

In the Claims

Column 33, Line 8 (Claim 24): Replace "The method of claim of claim 20," with --The method of claim 20,--

Signed and Sealed this  
Third Day of July, 2018

Andrei Iancu  
*Director of the United States Patent and Trademark Office*